(12) United States Patent
Hottelet et al.

(10) Patent No.: US 12,475,507 B2
(45) Date of Patent: Nov. 18, 2025

(54) DESIGN-AREA-BASED CONTEXTUAL RESIZING AND FILLING IN

(71) Applicant: Zazzle Inc., Menlo Park, CA (US)

(72) Inventors: Richard Peter Hottelet, Oakland, CA (US); Matthew Difonzo, Belmont, CA (US); Leslie Young Harvill, Olympia, WA (US)

(73) Assignee: ZAZZLE INC., Menlo Park, CA (US)

( * ) Notice: Subject to any disclaimer, the term of this patent is extended or adjusted under 35 U.S.C. 154(b) by 146 days.

(21) Appl. No.: 18/515,942

(22) Filed: Nov. 21, 2023

(65) Prior Publication Data

US 2025/0166053 A1    May 22, 2025

(51) Int. Cl.
*G06Q 30/06* (2023.01)
*G06Q 30/0241* (2023.01)
(Continued)

(52) U.S. Cl.
CPC ..... *G06Q 30/0643* (2013.01); *G06Q 30/0276* (2013.01); *G06Q 30/0621* (2013.01);
(Continued)

(58) Field of Classification Search
CPC ........... G06Q 30/0643; G06Q 30/0625; G06Q 30/0276; G06Q 30/0621; G06Q 30/0633; G06Q 10/10; G06T 11/00
(Continued)

(56) References Cited

U.S. PATENT DOCUMENTS

| | | |
|---|---|---|
| 2021/0357542 A1 | 11/2021 | Bowen et al. |
| 2023/0419583 A1* | 12/2023 | Williams ............. G06T 11/00 |
| 2024/0037717 A1* | 2/2024 | Amirghodsi ............. G06T 5/77 |

FOREIGN PATENT DOCUMENTS

| | | | | |
|---|---|---|---|---|
| JP | 2024506497 A | * | 2/2024 | ............. G06F 9/451 |
| KR | 102318952 B1 | * | 10/2021 | ............. G06N 3/08 |

OTHER PUBLICATIONS

Matuszczyk, et al. "Deep Learning Based Synthetic Image Generation for Defect Detection in Additive Manufacturing Industrial Environments," 2022 7th International Conference on Mechanical Engineering and Robotics Research (ICMERR), Krakow, Poland, 2022, pp. 209-218, from IP. Com on Jun. 11, 2025. (Year: 2022).*

(Continued)

*Primary Examiner* — Yogesh C Garg
(74) *Attorney, Agent, or Firm* — Patterson & Sheridan LLP.; Malgorzata A. Kulczycka

(57) ABSTRACT

In some embodiments, a method for generating digital image extensions contextually based on a custom image comprises: determining a plurality of image elements in a custom image based on one or more characteristics associated with image elements of the plurality of image elements; determining a plurality of product components of a custom product; for each product component: selecting one or more first image elements based on element characteristics associated with the one or more first image elements; based on the product component and the one or more first image elements, generating a first request for customizing the product component of the custom product; transmitting the first request to an AI-based image generator to cause the AI-based image generator to generate a first customized synthetic images for the product component; including the first customized synthetic images in a region corresponding to the product component of the custom product.

18 Claims, 21 Drawing Sheets

(51) Int. Cl.
  *G06Q 30/0601* (2023.01)
  *G06T 11/00* (2006.01)
(52) U.S. Cl.
  CPC ..... *G06Q 30/0625* (2013.01); *G06Q 30/0633* (2013.01); *G06T 11/00* (2013.01)
(58) Field of Classification Search
  USPC ....................................................... 705/27.2
  See application file for complete search history.

(56) References Cited

OTHER PUBLICATIONS

Veronika Shilova et al. "AdBooster: Personalized Ad Creative Generation using Stable Diffusion Outpainting", Arxiv.org, Cornell University Library, 201 Olin Library Cornell University Ithaca, NY 14853. Sep. 8, 2023.

International Search Report and Written Opinion for PCT Application No. PCT/US2024/047069, dated Jan. 16, 2025.

International Search Report and Written Opinion for PCT Application No. PCT/US2024/047070, dated Dec. 20, 2024.

"Inpainting With Stable Diffusion: What it is and How to Get Great Results", NightCafe Creator. Apr. 6, 2023.

Ayush Thakur and Sayak Paul, "Introduction to Image Inpainting with Deep Learning", https://wandb.ai/site/articles/introduction-to-image-inpainting-with-deep-learning. Apr. 2, 2020.

Anonymous: Artbreeder—Wikipedia. 1-20; Aug. 29, 2023 (Aug. 29, 2023) | XP093233621, Retrieved from the Internet: URL:https://en.wikipedia.org/w/index.php?t. itle=Artbreeder&oldid=1172850857 [retrieved on Dec. 12, 2024] the whole document.

International Search Report dated Dec. 12, 2024 for application No. PCT/US2024/047070.

* cited by examiner

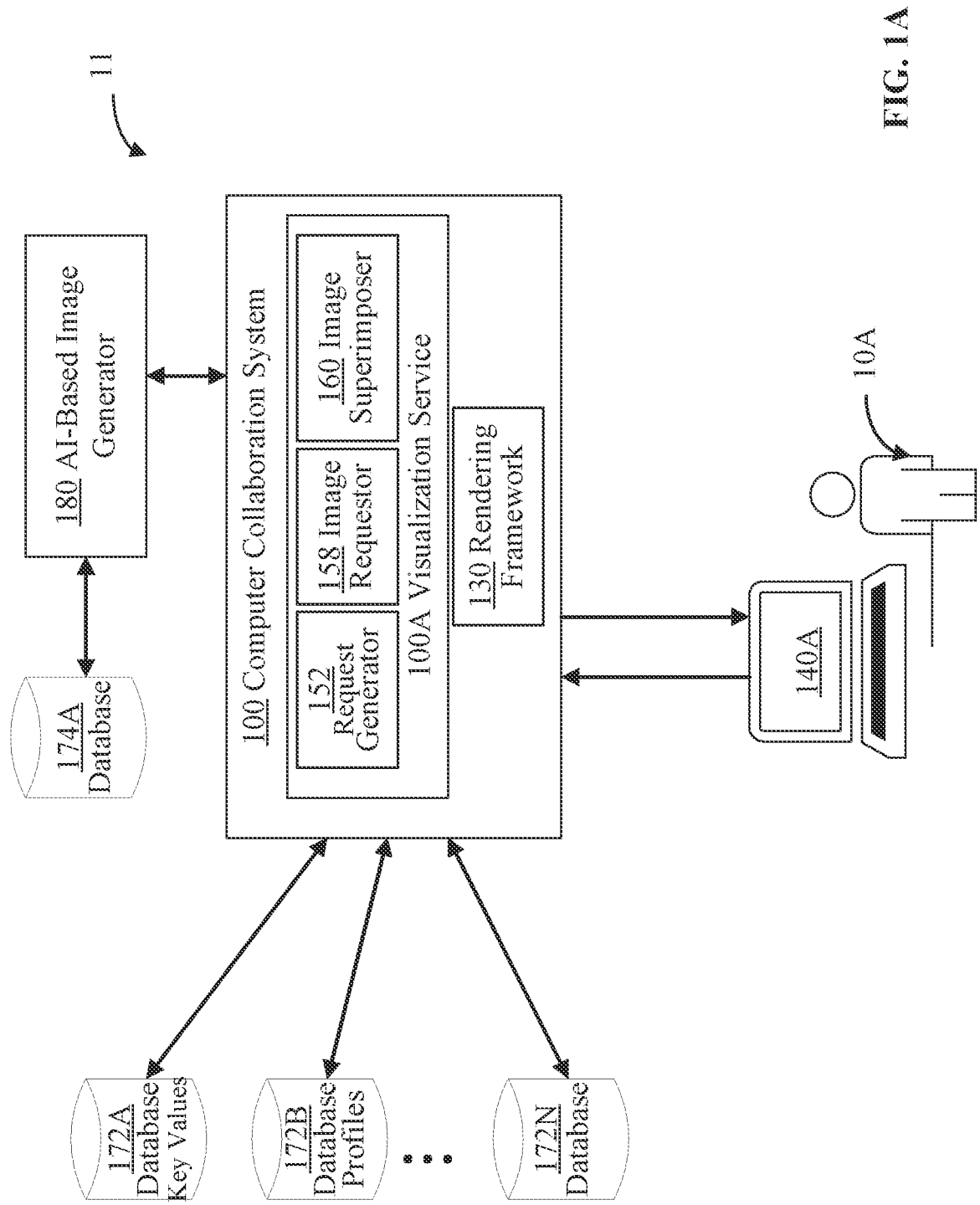

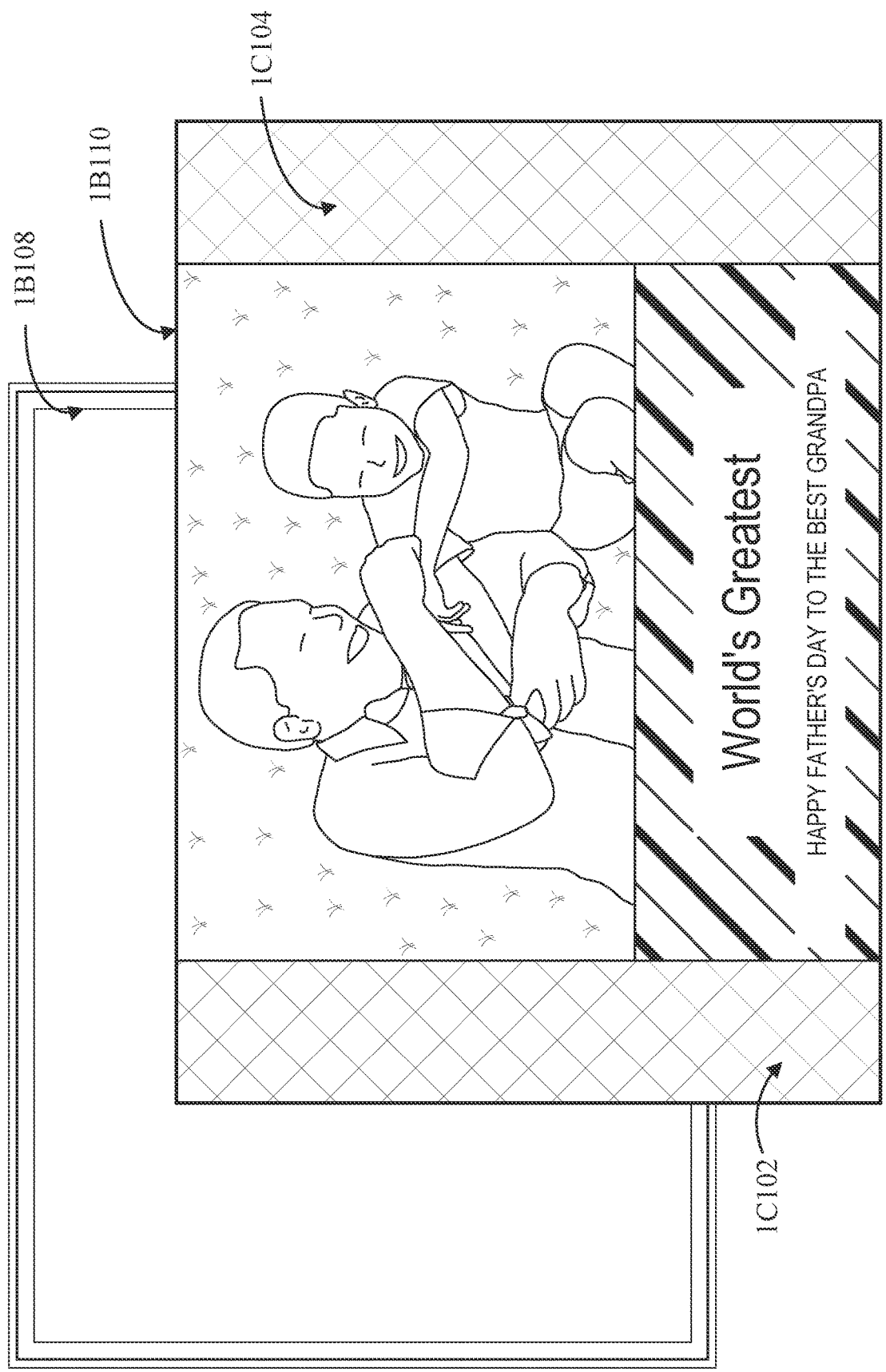

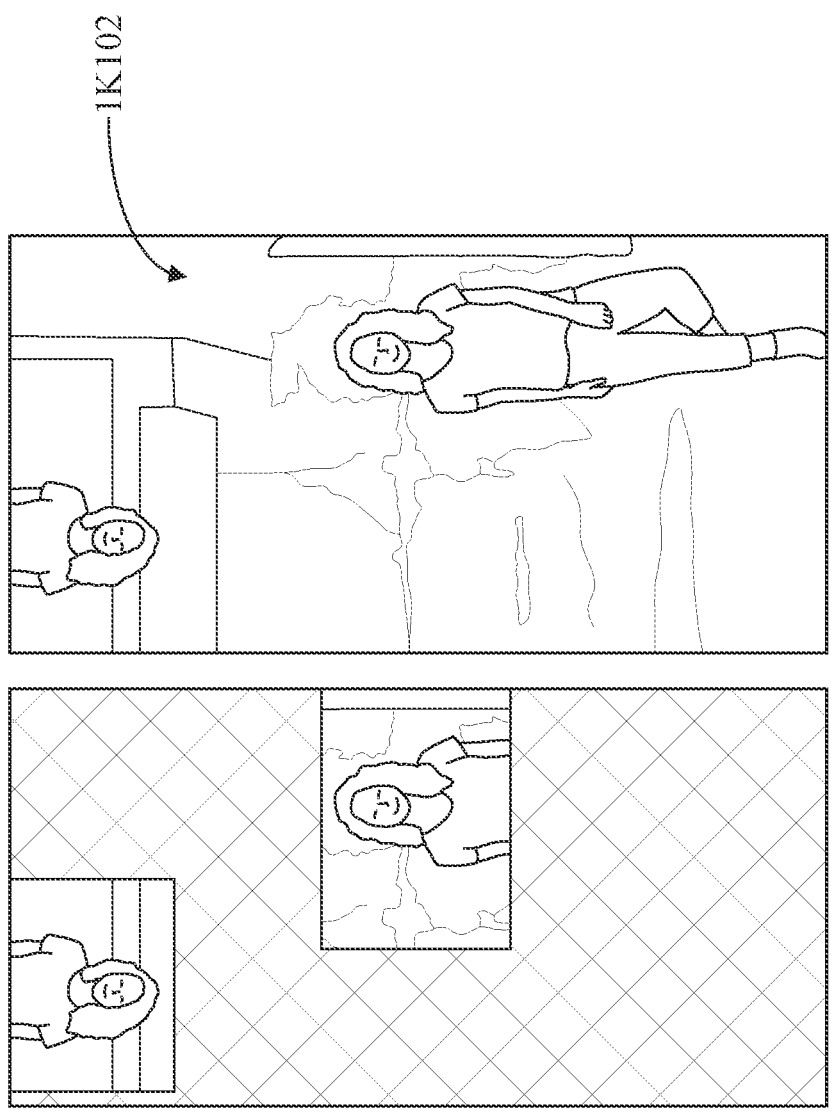

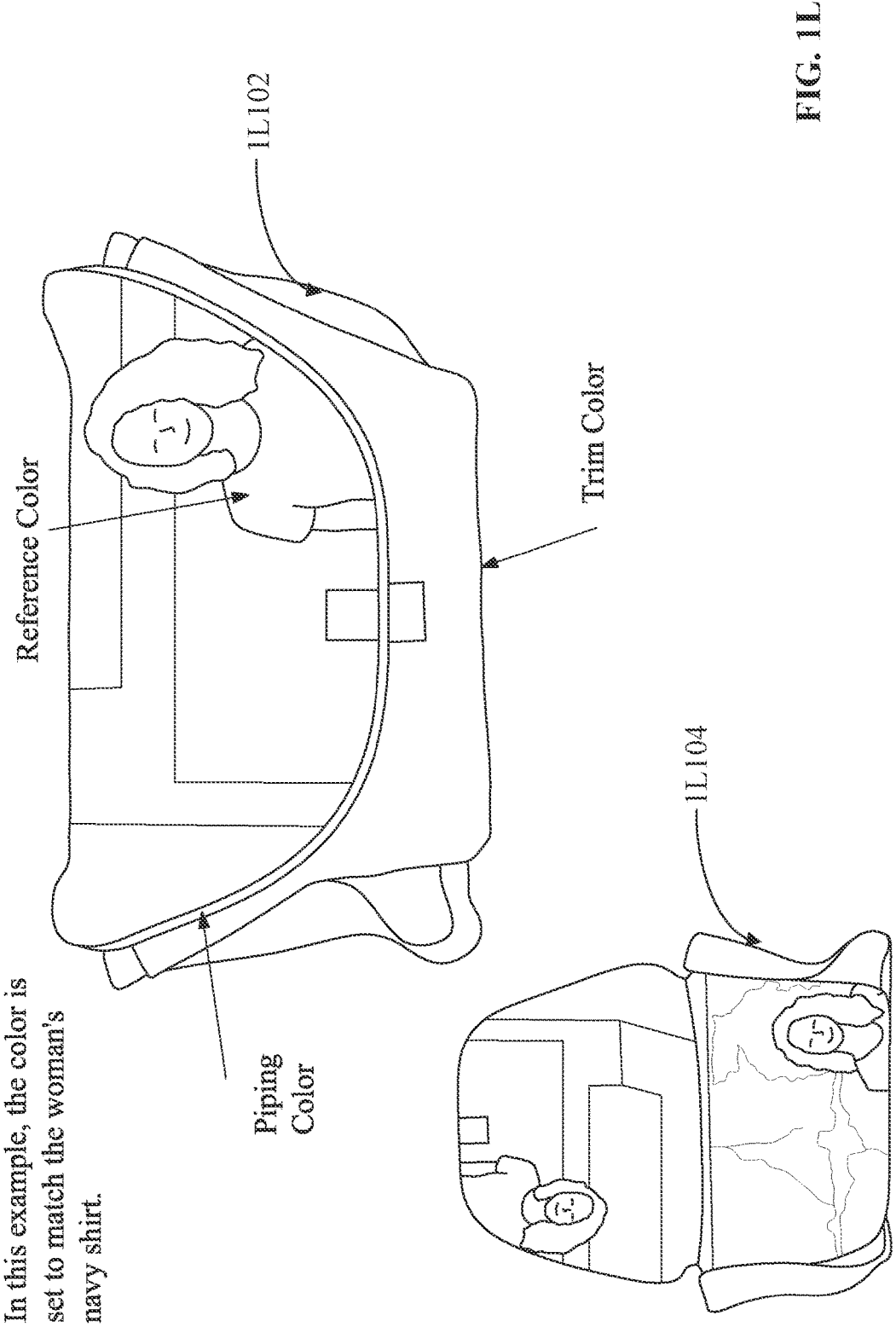

DESIGN-AREA-BASED CONTEXTUAL RESIZING AND FILLING IN

FIELD OF THE DISCLOSURE

One technical field of the present disclosure is digital image processing. Another technical field is computer-implemented techniques for generating digital synthetic images based on various types of information and sources. Another technical field is computer-implemented techniques for integrating the generated digital synthetic images with customized content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

The recent developments in image processing technologies and enhancements in manufacturing processes have spurred the rapid development of product customization techniques. Examples of such techniques may include fulfilling online orders received from customers who use their computer systems to customize depictions of generic goods and place online orders for individually customized goods.

Many systems offer the opportunity to order products that have customizable attributes. For example, in the case of custom-manufactured framed products such as photographs, digital images, artwork, or other products, the systems may offer the opportunity to order frames having customized sizes and colors.

However, product customization may be quite challenging. For example, customization of the customizable parameters may include a difficult process of customizing the values of the parameters to determine the appearance of the custom products. Most computer-based systems provide limited functionalities for displaying synthetic views of the custom products to help the users visualize their custom products.

Many current systems provide, for example, stock images as backgrounds for displaying custom products. However, since the stock images are usually prepared in advance, users usually cannot modify or customize them. Furthermore, using stock images rarely enhances the users' experience as the users customize the custom products.

Therefore, there is a need for developing tools that allow generating and rendering synthetic components for visualizing custom products effectively and efficiently. Such tools need to, for example, render the images efficiently and quickly, and without introducing a significant time delay. Furthermore, such tools need to generate and render images that have high quality and high accuracy. Moreover, such tools need to generate synthetic such synthetic backgrounds and components based on the information related to the custom products, certain aspects of the customization, and the like. Such synthetic images need to be generated, as mentioned before, on the fly, and in a real-time.

BRIEF DESCRIPTION OF THE DRAWINGS

FIG. 1A is a block diagram showing an example environment for design-area-based contextual resizing and filling in;

FIG. 1C is an example of options for processing byproducts;

FIG. 1I is an example of customization;

FIG. 1K is an example of customization;

FIG. 1L is an example of customization;

DESCRIPTION OF EXAMPLE EMBODIMENTS

Figure 1B:
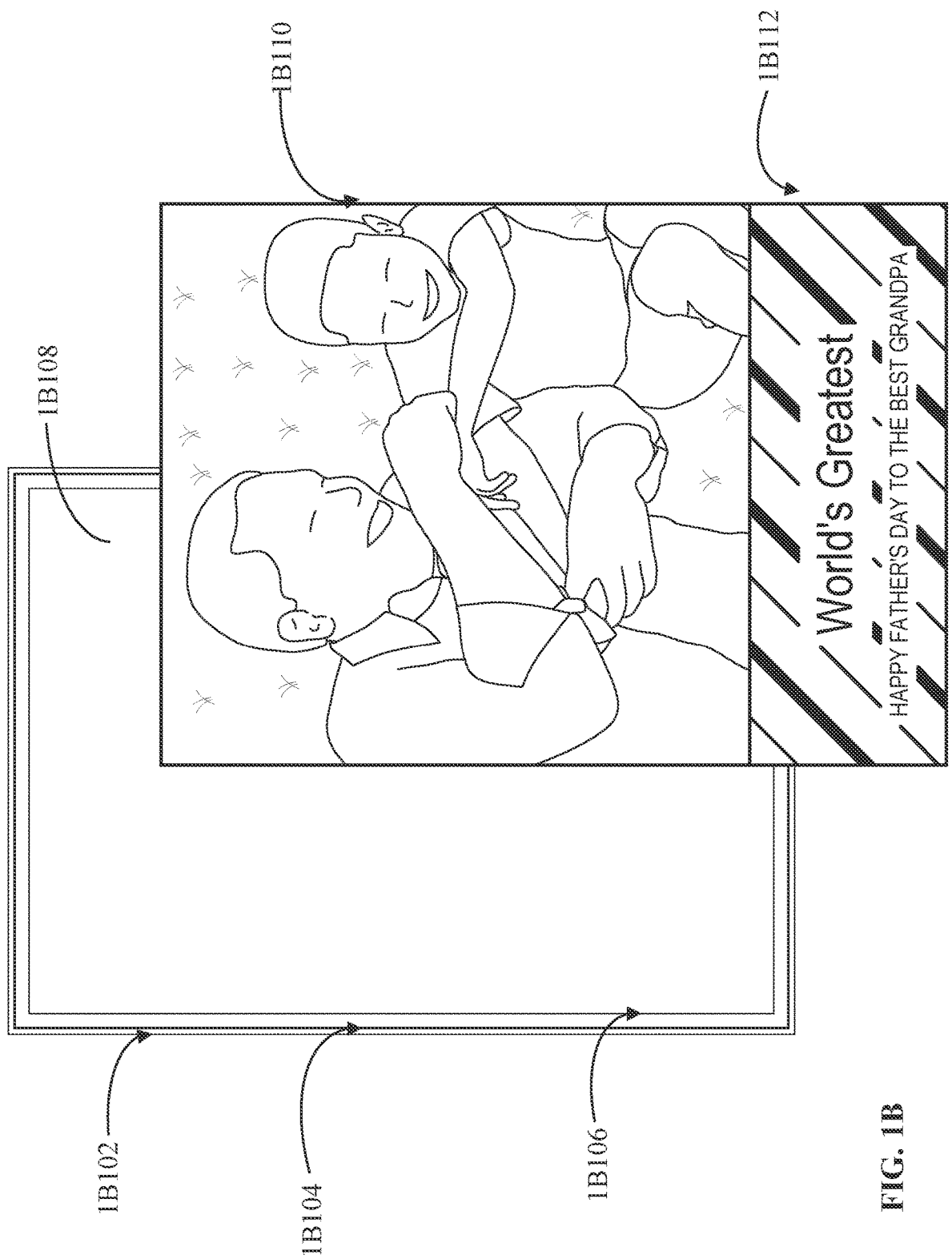
FIG. 1B is an example of options for processing byproducts.

In the following description, for the purposes of explanation, numerous specific details are outlined to provide a thorough understanding of the present invention. It will be apparent, however, that the present invention may be practiced without these specific details. In other instances, well-known structures and devices are shown in block diagram form to avoid unnecessarily obscuring the present invention.

Embodiments are described herein according to the following outline:

1. GENERAL OVERVIEW
   1.1. SYNTHETIC IMAGES
   1.2. EXAMPLE OF MAPPING A SYNTHETIC IMAGE ONTO COMPONENTS OF A CUSTOM PRODUCT
2. SYNTHETIC IMAGES FOR PRODUCT COMPONENTS
3. MULTIPLE SYNTHETIC IMAGES
4. DESIGN-AREA-BASED CONTEXTUAL RESIZING AND FILLING IN
5. SYNTHETIC IMAGES
   5.1. COMPUTATIONAL ENVIRONMENT
   5.2. IMAGE EXTENSIONS
   5.3. NEURAL NETWORKS
   5.4. STABLE DIFFUSION
   5.5. INPAINTING
   5.6. SYNTHESIZED IMAGES
6. STRUCTURAL DESCRIPTION AND OBJECTIVE MEASUREMENT OF NOVEL USE OF LATENT DIFFUSION MODEL-BASED AI 6.1. INPUTS TO LATENT DIFFUSION MODEL NEURAL NETWORKS
    6.1.1. CONTEXTUAL INPUT IMAGES
    6.1.2. TEXT INPUT TO TEXT-TO-IMAGE SERVICE
6.2. REQUIREMENTS FOR GENERATING IMAGE REGIONS
6.3. AUTOMATIC OBJECTIVE MEASURES
6.4. OBJECTIVE IMPROVEMENTS
6.5. REQUESTS
7. EXTENSIONS FOR MULTIPLE IMAGES
8. BASE IMAGES
9. GENERATING SYNTHETIC IMAGES USING AI
    9.1. REQUESTS
    9.2. AI-BASED IMAGE GENERATOR
    9.3. SYNTHETIC IMAGES
10. EXAMPLE MANUFACTURING SYSTEM
    10.1. STRUCTURAL DESCRIPTION OF AUTHORING TOOL
    10.2. DESIGNING AN ASSET
    10.3. ASSET DEFINITION DATA
    10.4. USER DEVICES
    10.5. CLIENT APPLICATIONS
    10.6. FRONTEND SERVERS
    10.7. CORE SERVICES
    10.8. EXAMPLE MANUFACTURING SYSTEM
    10.9. EXAMPLE MANUFACTURING PROCESS
11. EXAMPLE PRODUCT COLLABORATION PLATFORM
12. EXAMPLE FLOW CHART FOR A SYNTHETIC IMAGE EXAMPLE
13. EXAMPLE FLOW CHART FOR MULTIPLE SYNTHETIC IMAGES
14. EXAMPLE FLOW CHART FOR MULTIPLE SYNTHETIC IMAGES AND MULTIPLE COMPONENTS OF A CUSTOM PRODUCT
15. IMPLEMENTATION MECHANISMS

1. General Overview

The disclosure included herein presents technical solutions to technical problems, and any interpretation of the disclosure or claims to cover any judicial exception to patent eligibility, such as an abstract idea, mental process, method of organizing human activity, or mathematical algorithm, is erroneous and unsupported by this disclosure.

One of the technical problems that the presented approach is solving is the lack of methods for generating custom images from input images and computer-generated images efficiently, accurately, and without a significant delay. The technical solutions presented herein include using data structures for storing characteristics of the input images, characteristics of to-be-generated computer-based images, and other characteristics that allow rendering of the resulting images proficiently, precisely, and in a so-called pseudo-real-time. The data structures may be used to store, for example, image encoding information of a custom image and information about a customization process for customizing the custom product. The stored information may be used to generate requests, described in detail later.

The technical solutions presented herein are based, at least partially, on artificial intelligence (AI) approaches and tools. AI-based tools offer tremendous potential in terms of, for example, image generation and customization, and in particular in augmenting and enhancing the images. For instance, AI-based tools may be used to generate synthetic images that otherwise would be difficult and time-consuming to obtain.

1.1. Synthetic Images

One of the AI-based approaches can be utilized in online digital customization to produce imagery for a custom product. This may include creating and generating on-the-fly synthetic images to enhance the customization of the products. The on-the-fly (i.e., almost in real-time) generated images may be customized in various ways, including matching the content of synthetic images to the custom product.

One of the unique aspects of the presented approach is that the synthetic images for the custom product are generated on the fly. They may be generated or synthesized from images selected from image repositories. The image selection may be performed using provided keywords, terms, descriptions, and the like. The on-fly-generated images are not the actual images selected from the repository. Instead, the on-fly-generated images are uniquely generated and synthesized from the images selected from the repositories.

The synthetic images generated by AI-based generative applications are unique and specific to, the custom product, the user-provided image, and the like. They are not, however, predefined embellishment patterns, predefined framing, or the like.

The synthetic images described herein are to be applied to a so-called imprint area, or a portion of the imprint area. The imprint area in this context can be a design area on either a physical product or a digital product as well. As it will be described later, the knowledge of how the bounds of those areas are constructed and how they relate to the custom products is important for achieving satisfactory results.

Suppose that a custom product is a mug that, for example, has a certain 5" by 10" imprint area onto which a 5" by 7' card is to be applied. The card has a certain outside area that is outside the imprint area. The imprint area may be specified in a pixel space, in this example, the certain imprint area could be 720 by 1280 pixels.

1.2. Example of Mapping a Synthetic Image onto Components of a Custom Product

FIG. 1B is an example of options for processing byproducts. In practice, an imprint area is rarely defined by the edges of one rectangle. The actual edges may include, as shown in FIG. 1B, three rectangles, including an exact imprint rectangle 1B106 (corresponding to the exact imprint dimensions), a bleed rectangle 1B104 (i.e., the rectangle usually outside the exact imprint rectangle), and an outside rectangle 1B102. The area between the exact imprint rectangle and the bleed rectangle is the area in which imprinted image 1B110 combined with text 1B112 may be shown. Furthermore, if image 1B110 combined with, for example, text 1B112 is mapped onto imprint rectangle 1B106 in such a way that the image 1B110 combined with text 1B112 does not cover the entire imprint rectangle 1B106, then the areas of imprint rectangle 1B106 that are not mapped with 1B110-1B112 may be covered using one or more synthetic images generated using AI-based tools and applications, as described later.

Referring again to FIG. 1B, a blue rectangle corresponds to a visible area. In the example depicted in FIG. 1B, it may be a 5-inch by 7-inch area. The green area could be the area that is typically shown to users to give them an idea of how the imprinted area would look (i.e., what area would be considered safe). A safe line does enclose the area; anything placed within the green box is guaranteed to show up on the card, while anything that extends between the blue and the red lines would be considered the bleed. Hence, anything in that area can potentially be cut or not included in a final 5" by 7" product.

An embellishment area is a combination of that same concept, i.e., the exact area that a design occupies in a physical object, along with any of the print specifications, to account for printing inaccuracies like the bleed or any shifting in printing that need to be taken into account. Often, there is no need to specify a bleed area in a digital product because there is no loss in terms of cutting.

However, in the case of imprinting, for example, a card on a custom product, one usually needs to add a little bit of extra room (i.e., within some tolerance) defined by the bleed area.

In the context of this disclosure, it is important to preserve the context of a user's design, and it is important to consider the physical dimensions of the imprint area and the mapping to the physical dimensions.

Referring again to FIG. 1B, suppose that a custom product is a greeting card 1B108 for Father's Day. The card may include a photograph 1B110 of a grandfather and his grandson. One of the problems, however, is that the photograph has a different height-to-width ratio than the height-to-width ratio of the greeting card. For example, as described in detail later, the height of the greeting card and the photograph may be the same, but the widths may be different. Most likely, a user may not be interested in stretching the photograph (and thus changing the ratio of the photograph) to meet the dimensions of the greeting card. Instead, the user might prefer that, for example, the photograph be centered in the greeting card, and the sides of the card that are not covered by the photograph be filled in using synthetic images that have a design and color scheme styled based on the content of the photograph itself.

The techniques used for such fill-ins, or extensions, may include generating on-fly-generated, synthetic images that match the custom product in terms of the occasion, the color scheme, and the like. The on-the-fly generated images may be synthesized from a large set of selected pictures stored in the repository, and using AI-based approaches. Such an AI-based generated image may be included in, for example, to fill in the areas, for example, in a greeting card not covered by the depiction of the user's photograph pasted onto the greeting card. Moreover, as the product is further customized by, for example, changing the product color, a new synthetic image may be generated on the fly to match the new color scheme of the custom product. The process of generating the AI-based synthetic images is described later.

2. Synthetic Images for Product Components

Synthetic images described herein may be used to fill, or augment, various components of custom products. Suppose a user provided a digital image that includes a picture of a grandfather playing with his grandson. Furthermore, suppose that the user is customizing a greeting card for Father's Day. The greeting card has a different aspect ratio. Therefore, assuming that the aspect ratio of the digital image is to remain unchanged, a plane mapping of the digital image onto the greeting card would result in having a greeting card having some unmapped areas. Having the "empty," i.e., unmapped areas in the greeting card is usually undesirable.

The solutions presented herein allow to generate synthetic images using AI-based approaches based on various types of information and using them to fill in or augment, the custom products (e.g., the greeting card in the above example) so that the empty areas become covered with visual content that is contextually related to the digital image (e.g., the picture of the grandfather and his grandson in the above example).

Continuing with the above example, the digital image that includes the picture (e.g., depicting the grandfather and his grandson) may be sent to an AI-based application along with a request to generate a synthetic image. The request, as described in detail later, may specify, for example, an area onto which the synthetic image is to be mapped, the size of that area, the color scheme, and the like.

As is described later, the request may also specify that not just one, but several synthetic images are to be generated using the AI-based approach. As is also described later, the request may specify not just one area onto which the synthetic images are to be mapped, but several areas onto which the same synthetic image or different synthetic images are to be mapped.

Referring again to the grandfather-grandson example, the digital image depicting the grandfather and his grandson may be sent along with the request (as described above) to an AI-based application to generate one or more synthetic images.

An AI-based application and AI-based tool are used to generate a synthetic image based on various elements of a custom image. For example, the synthetic image may be generated based on, e.g., one or more image elements of the digital image depicting the grandfather and his grandson, and may be applied to one or more components of the custom product (i.e., the greeting card). For instance, an AI-based application may receive a request to generate one or more synthetic images based on the user-provided digital image and based on the areas in the custom product (i.e., the greeting card). The generated synthetic image(s) may be used to augment the custom product to, for example, fill in the "empty" areas that have not been covered with the digital image of the grandfather and the grandson. This example is illustrated in FIG. 1C.

3. Multiple Synthetic Images

In some implementations, the approach includes generating multiple synthetic images and applying the multiple synthetic images to multiple components of a custom product. The process of identifying the different components of the custom product and the process of requesting the multiple synthetic images to be then applied to the components are described below.

The approach may include determining a plurality of image elements in a custom image based on one or more characteristics associated with image elements of the plurality of image elements. If the custom image is, for example, a picture of a grandfather and his son, then the plurality of image elements may include an image of the grandfather, an image of the grandson, an image of the background, and the like.

The approach may also include determining a plurality of product components of a custom product. If the custom product is, for example, a greeting card, then the plurality of components may include a left part of the invitation, a right part of the invitation, an upper part of the invitation, a lower part of the invitation, a cover page of the invitation, and the like.

The approach may also include determining a subset of the plurality of product components of a custom product. Continuing with the greeting card example, the subset of the plurality of product components for the greeting card may include, for example, the left part of the invitation, the right part of the invitation, and the lower part of the invitation.

Furthermore, the approach may include selecting, for each component of the subset of the plurality of product components of the custom product, one or more second image elements, from a plurality of images, based on element characteristics, from the one or more element characteristics, associated with the one or more second image elements. Based on the subset of the plurality of product components and the one or more second image elements, a request for customizing the subset of the plurality of product components of the custom product is generated. Various ways of determining the request are described later.

The approach may also include transmitting the request to the AI-based image generator to cause the AI-based image generator to generate, based on, at least in part, the request, a customized synthetic image for the product component. Therefore, the customized synthetic image is (1) generated based on, e.g., one or more image elements from two or more images, and (2) applied to one or more product components, e.g., different parts of the same custom product, or products. In some implementations, a synthetic image is generated based on one or more image elements of a plurality of images (e.g., two pictures of a male model, as shown in FIG. 1I.) The same synthetic image may be applied to one or more product components at a time.

The approach also comprises including the second customized synthetic image in one or more regions corresponding to the subset of the plurality of product components of the custom product, and causing displaying, on a display device, a graphical visualization of the custom product.

FIG. 1C is an example of options for processing byproducts. In FIG. 1C, an image 1B110 is augmented by adding a left side 1C102 and a right side 1C104. The sizes of the 1C102 and 1C104 may be determined in such a way so that the whole image 1B110 combined with 1C102 and 1C104 are going to fit the dedicated space outlined using rectangle 1B108.

In some implementations, the areas including left side 1C102 and right side 1C104 may be augmented by mapping onto them one or more synthetic images generated by an AI-based application and tools. For example, based on the digital image shown as 1B110, the AI-based application may generate one or more synthetic images that have the color scheme, patterns, some elements of the digital images, and the like, but that are unique, and thus are different than the digital image itself or any other image retrieved from the Internet or other sources.

A count of synthetic images generated by the AI-based application/tools depends on a request that may specify the count of synthetic images either implicitly or explicitly. For example, the request may specify that two different synthetic images are requested and that the two images are to be different from each other, but that they need to be synthesized based on a user-provided image (or images) as well as the images stored in the image depository, which is described later.

Figure 1D:
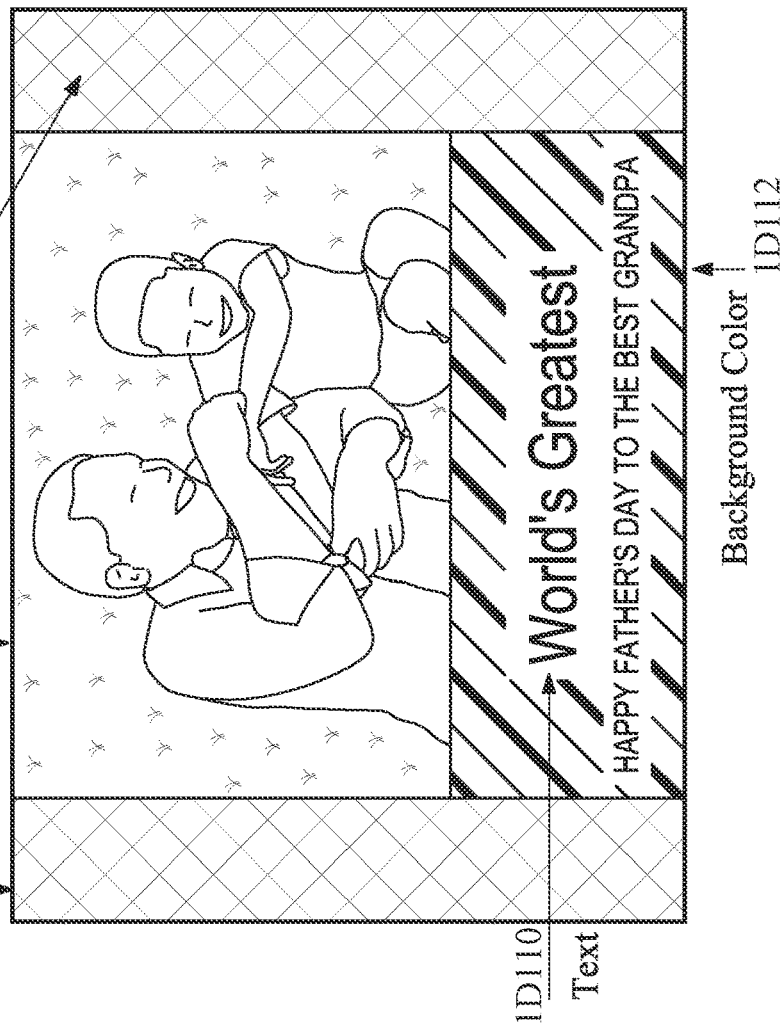
FIG. 1D is an example of customization.

FIG. 1D is an example of customization. The depicted example is provided to illustrate one of many examples and is provided one of many implementations of the presented approach. FIG. 1D shows two target areas for inpainting images. Other examples may include additional target areas. The two target areas include areas 1D104 and 1D106. The example depicted in FIG. 1D also shows a text area 1D119 that has a background color 1D112.

The images shown in FIG. 1D may be represented using various constructs and structures. In one implementation, they may be captured using design area layers 1D102. The design area layers may capture a user's design and provide key regions of interest that may be used when performing a transfer of a custom product onto a new design area. The design area layers may include a front layer, a text layer (in FIG. 1D, the text layer includes the text "World's Greatest"), and another text layer (in FIG. 1D, that text layer includes the text "Happy Father's Day to the Best Grandpa"). The design area layers may also include a user's image, i.e., the interface that allows a user to add his image. There might be also a layer allowing setting a color of the background, and some other options allowing editing the design area layers and subsequently allowing editing the appearance of the image in the area 1D108.

Figure 1E:
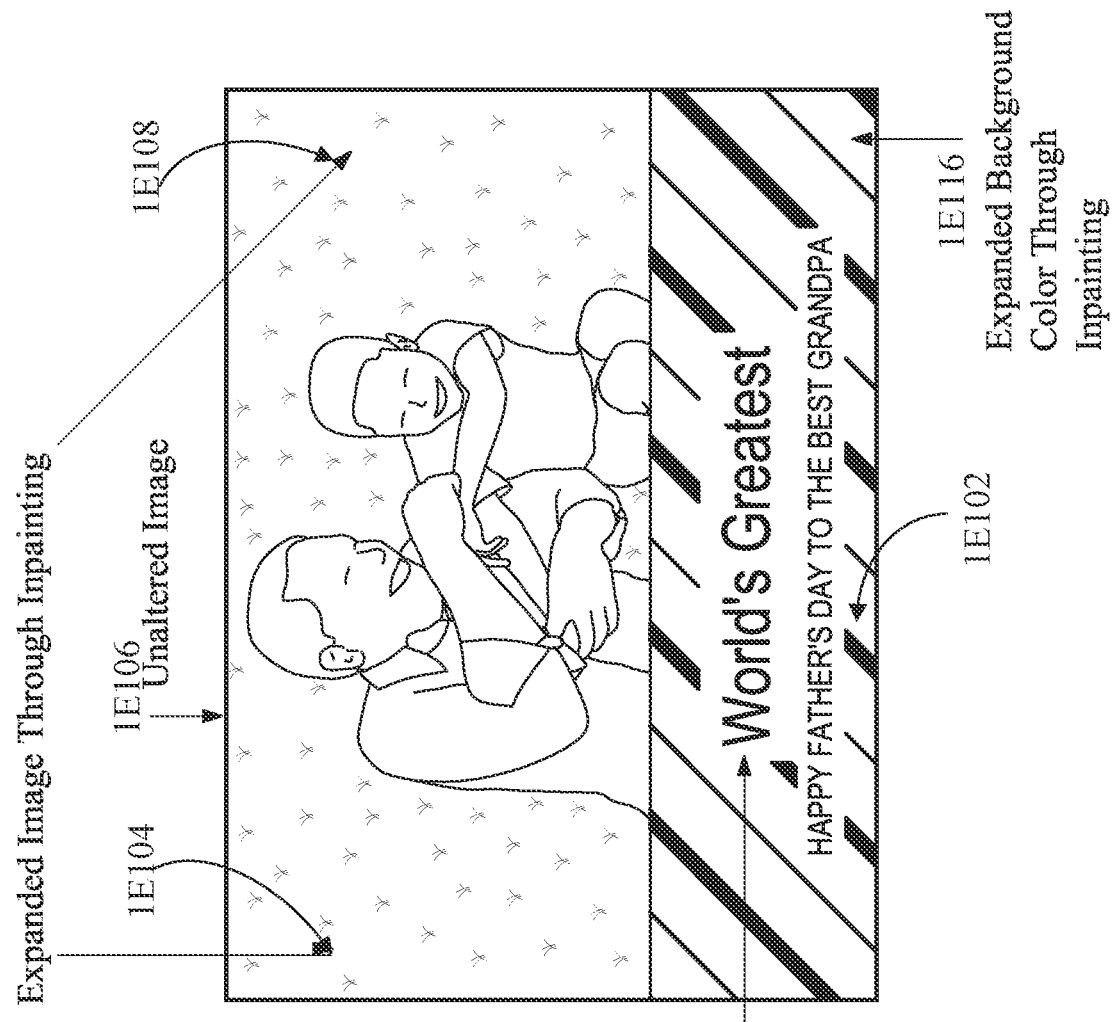
FIG. 1E is an example of customization.

FIG. 1E is an example of customization. In the depicted example, an unaltered image 1E106 is augmented on the left side by adding an expanded image through inpainting 1E104. Unaltered image 1E106 is also augmented on the right side by adding an expanded image through inpainting 1E108. The images used to augment unaltered image 1E106 are synthetic images generated based on the unaltered image 1E106. The synthetic images may include some elements of the unaltered image 1E106 in FIG. 1E that are depicted using the check marks.

Since the FIG. 1E is a black-line drawing, the synthetic images are depicted using only black-line elements. However, if FIG. 1E were a color drawing, then the complexity of the synthetic images would be more adequate. For example, the synthetic images could match unaltered image 1E106 in terms of the color scheme, the image details, the image composition, and the like.

Design area inpainting is guided by regions defined by a user or recognition by an AI-based application. The design area inpainting is used herein to generate additional matching content to expand the original concept without changing the content of the concept. The synthetic images are generated using AI-based applications and tools in such a way that they indeed match many elements of the unaltered image 1E106, such as the color scheme, the image details, the image composition, and the like. The model usually needs to be trained or instructed in a specific way so that the synthetic images do match well to the customized image. The synthetic images, however, are not copies of unaltered image 1E106 or any other image. They are generated using the AI approaches that involve synthesizing various elements of unaltered image 1E106 and, in some situations, many other images scraped from, for example, the Internet.

FIG. 1E also depicts another application of synthetic images to a custom product. More specifically, FIG. 1E also shows another unaltered text, which is an unaltered text 1E114 (it reads "World's Greatest") and unaltered text 1E102, which reads "Happy Father's Day to the Best Grandpa." Unaltered text 1E114 is augmented using an expanded background color 1E116 through inpainting.

As it will be described later, one unaltered image may have many elements, and each subset of the elements may be used to generate a request to an AI-based application. The request may specify the elements of the unaltered image to be used and other things that the AI-based application may use in the process of one or more synthetic images.

Once the synthetic images are generated by the AI-based application, the images are provided to a computer collaboration system (described later) that includes the received synthetic images into an unaltered image. This may include selecting a subset of synthetic images and mapping them onto the components of the custom product that have not been covered by the unaltered image.

FIG. 1E shows a custom product (i.e., a greeting card for Father's Day), and the custom product has several extended areas that are outside an unaltered image. Each of the extended areas may be filled in (or inpainted) using one or more synthetic images. The selection of a synthetic image, from a group of synthetic images, and the selection of a mapping of the selected synthetic image onto an element or elements of the custom product may be either random or managed by the collaboration platform or users.

In some embodiments, a custom product may be a bag that has several product components. The components may include the bag's main compartment, the bag's flap, the bag's piping, the bag's belt, and the like. In this example, the AI-generated synthetic images may be mapped onto individual components of the bag. For example, one synthetic image may be mapped onto the frontal side of the bag's main compartment, another synthetic image may be mapped onto the bag's piping, and another synthetic image may be mapped onto the bag's belt, and so on. Hence, the approach includes generating multiple synthetic images and mapping them in an orderly fashion onto various components of the custom product. Additional examples are described in, for example, FIG. 1M.

Figure 1F:
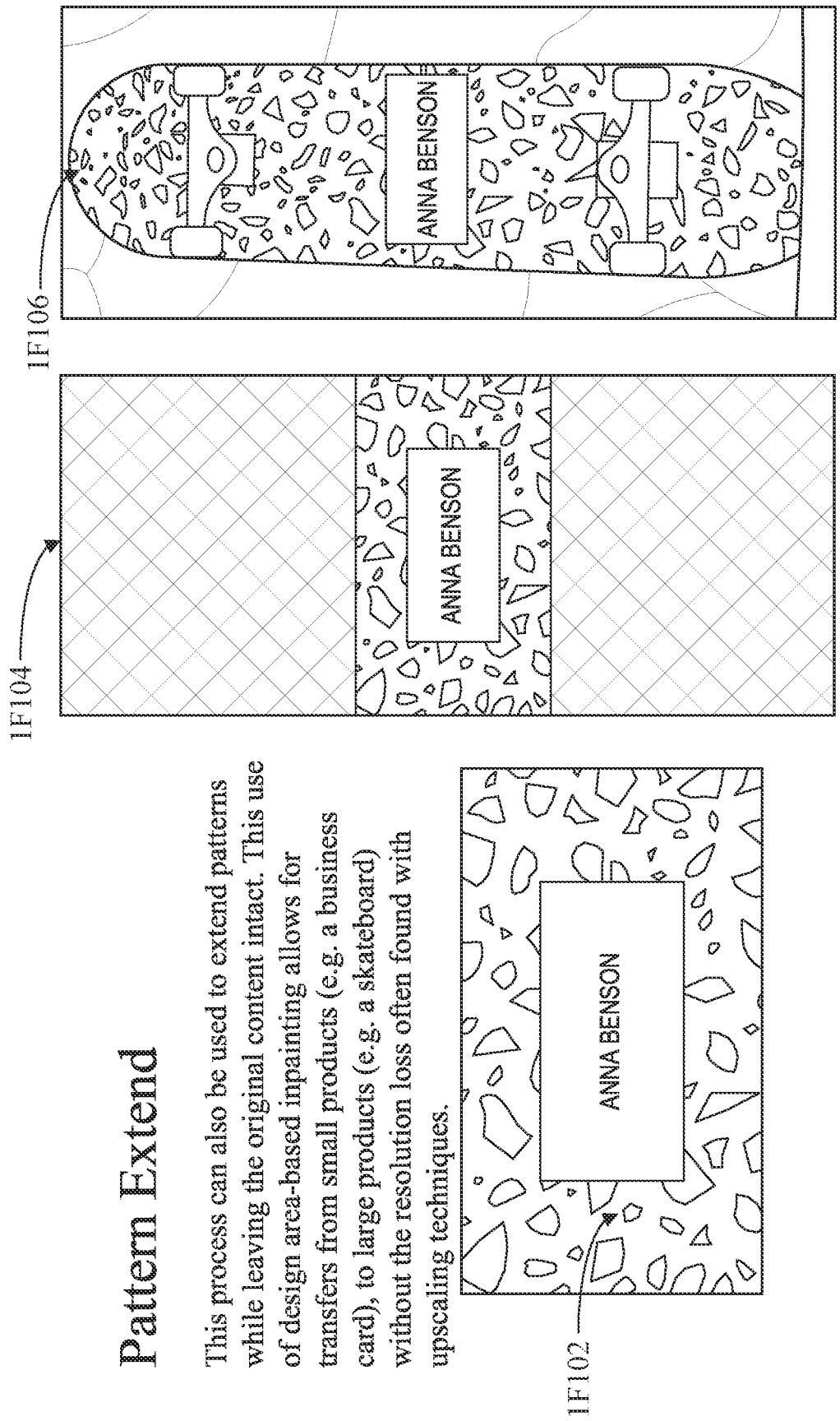
FIG. 1F is an example of customization.

FIG. 1F is an example of customization. According to the example depicted in FIG. 1F, suppose that a custom product is a skateboard 1F106 and the customization includes applying the content of a business card 1F102 to the skateboard. Most likely, the dimensions and the ratio of the business card do not match the dimensions and the ratio of the skateboard. Therefore, applying the business card to the skateboard may include applying the image of the business card to the skateboard, and filling in the side spaces 1F104 on the skateboard that are not covered by the business card. The filling-in may include applying the content of, for example, a synthetic image that matches the content of the business card. Such a synthetic image is referred to herein as an extension image.

In this example, the content of the business card may be used to generate on-the-fly content to be used to fill in the side spaces on the skateboard. Suppose that the business card includes, for example, an abstract mosaic arrangement, as shown in FIG. 1F. The mosaic arrangement may be used to generate a synthetic image (i.e., an extension image) that captures in some sense the mosaic shown in the business card. An example arrangement is shown in FIG. 1F. The language "extension image" may, for example, capture in some sense the mosaic shown in the business card. This kind of explanation may also be used without being bound to the business card or the skateboard (hence, an intermediate abstraction could be avoided here).

In some embodiments, key-value pairs (described in detail later) are used to specify the content for the extension image. The process of determining the extension image, also referred to as "inpainting," relies on the image content, and also takes into account the key-value pairs and metadata associated with the image and/or a custom product.

There may be situations where several on-fly-generated images are generated for a custom product. The images may be superimposed or otherwise fused or merged with the depiction of the custom product. Including synthetic images allows for enhancing the quality of the product customization and enhancing the quality of the product presentation.

In some situations, the on-the-fly generated images are part of a product description. The description may also include information about a markup area (e.g., in the UV coordinate system), which is defined through field markup, digital markup, yellow grids, inverted yellow grids, mesh deformation, masks, or others. If, for example, the description includes a UV markup area within a custom product, then an on-fly-generated image may be applied to the area defined by the UV markup.

According to another example, if the description includes a mask area, then an on-the-fly generated image may be applied to the masked area. The mask may be used to delineate the region (or regions) which may correspond to sides, and which, for example, can be replaced using AI-based synthetic images.

4. Design-Area-Based Contextual Resizing and Filling in

In some implementations, the solutions presented herein involve generative AI. The generative AI may be used to, for example, generate synthetic fill-in images based on input parameters and the corresponding input values. The input parameters may include information about custom products, user profiles, context information, Alpha channel information, custom product key-value pairs (all described later), and the like. Parameters used to create generative AI images may also include custom product context and other information related to the product. The parameters and their values may be provided to a generative AI computer network to execute the AI application on the provided parameters to generate output, which in this case includes synthetic images and the like.

For the purpose of this description, the output from a generative AI computer network provides, for example, synthetic images that can be used to fill in areas between custom images, user-provided photographs, and the like.

5. Synthetic Images

5.1. Computational Environment

FIG. 1A is a block diagram showing an example environment 11 for design-area-based contextual resizing and filling in. FIG. 1A, the other drawing figures, and all of the descriptions and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

Environment 11 depicted in FIG. 1A is configured to perform contextual resizing and filling in a design area. One of the elements of environment 11 is a computer collaboration system 100, which is described in detail later. For the clarity of the description, computer collaboration system 100 comprises a visualization service 100A, which in turn comprises a request generator 152, an image requestor 158, an image superimposer 160, and a rendering framework 130 (described in detail later). All components are described in detail later.

Collaboration system 100 may also include other components, examples of which are described later.

In some implementations, environment 11 also includes a database 172A storing key-value pairs (described later), a database 172B storing user profiles (described later), and one or more other databases 172N for storing additional information used by various components of environment 11 and/or computer collaboration system 100.

Environment 11 may also include a database 174A, or a distributed or cloud-based system, that can be used as storage for, e.g., billions of digital images of publicly available digital images. Such images may be downloaded from public resources, databases, and other repositories. For example, the images may be downloaded from the Internet and may represent part of the DALL-E system (described later).

Images stored in database 174A, or in some other storage included in environment 11 may be used by an AI-based image generator 180. AI-based image generator 180 may be an AI-based application that is configured to, for example, implement the stable diffusion approach for generating or synthesizing images in response to receiving a textual query.

5.2. Image Extensions

One of the techniques presented herein is generating image extensions. The technique allows filling in (i.e., extending), for example, the sides of an image with the artificially generated content that has the color scheme and some other attributes similar to those in the image. The artificially generated content may be generated in such a way that it looks realistic even though it is not copied from any other image, and is not obtained by copying and pasting some stock images. The content may be generated using AI-based tools, some of which are described later.

Figure 1G:
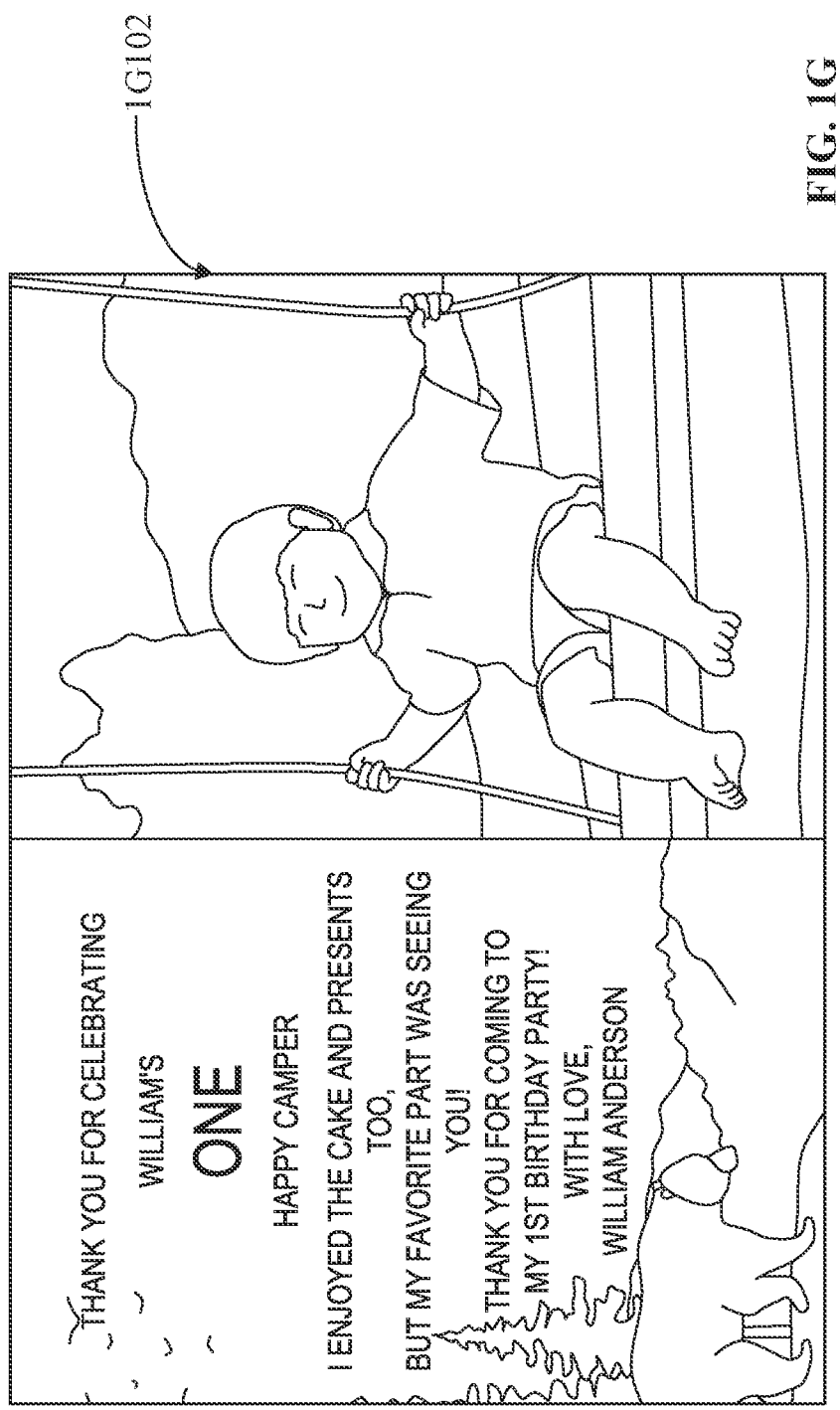
FIG. 1G is an example of customization.
Figure 1H:
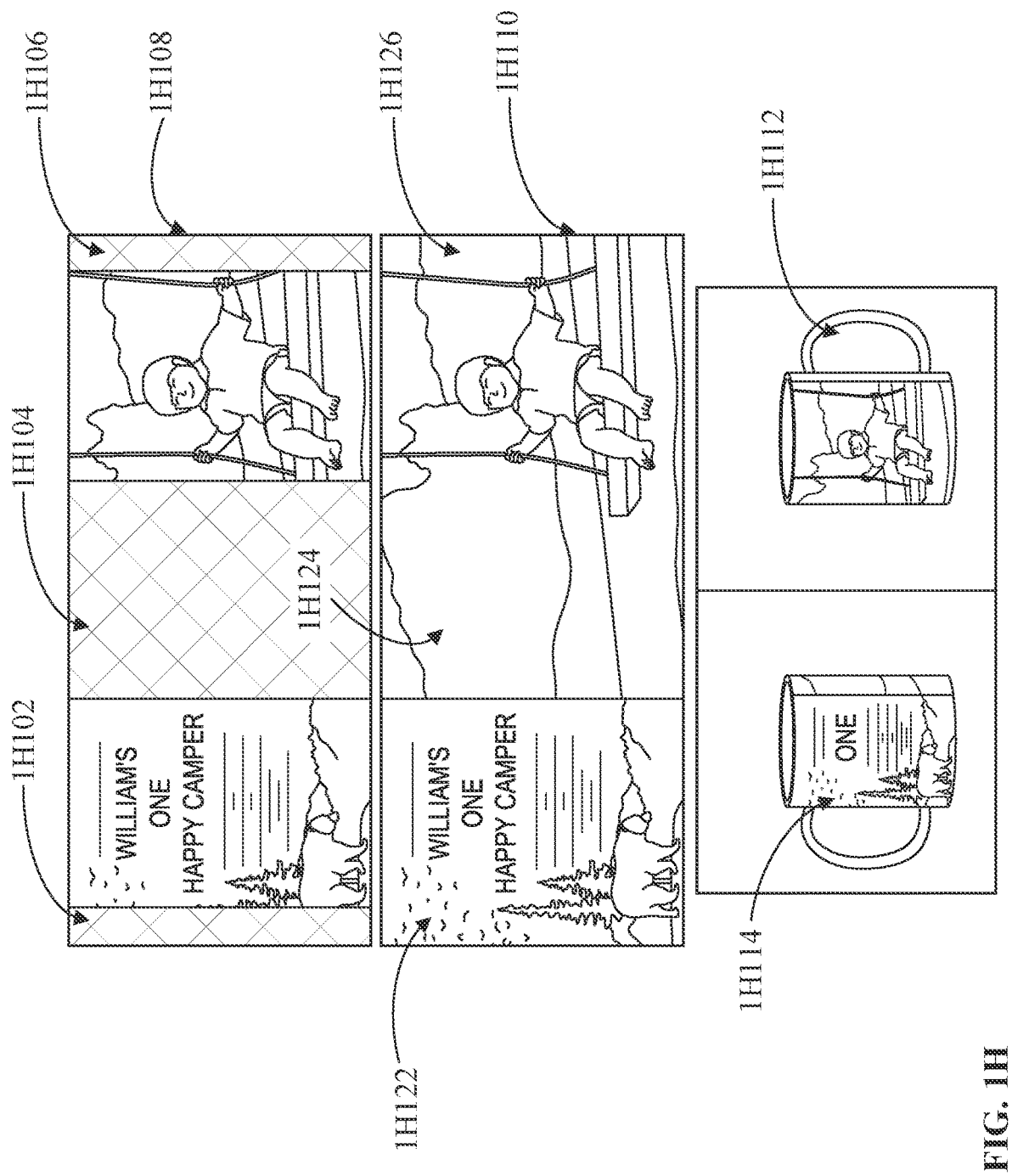
FIG. 1H is an example of customization.
Figure 11:
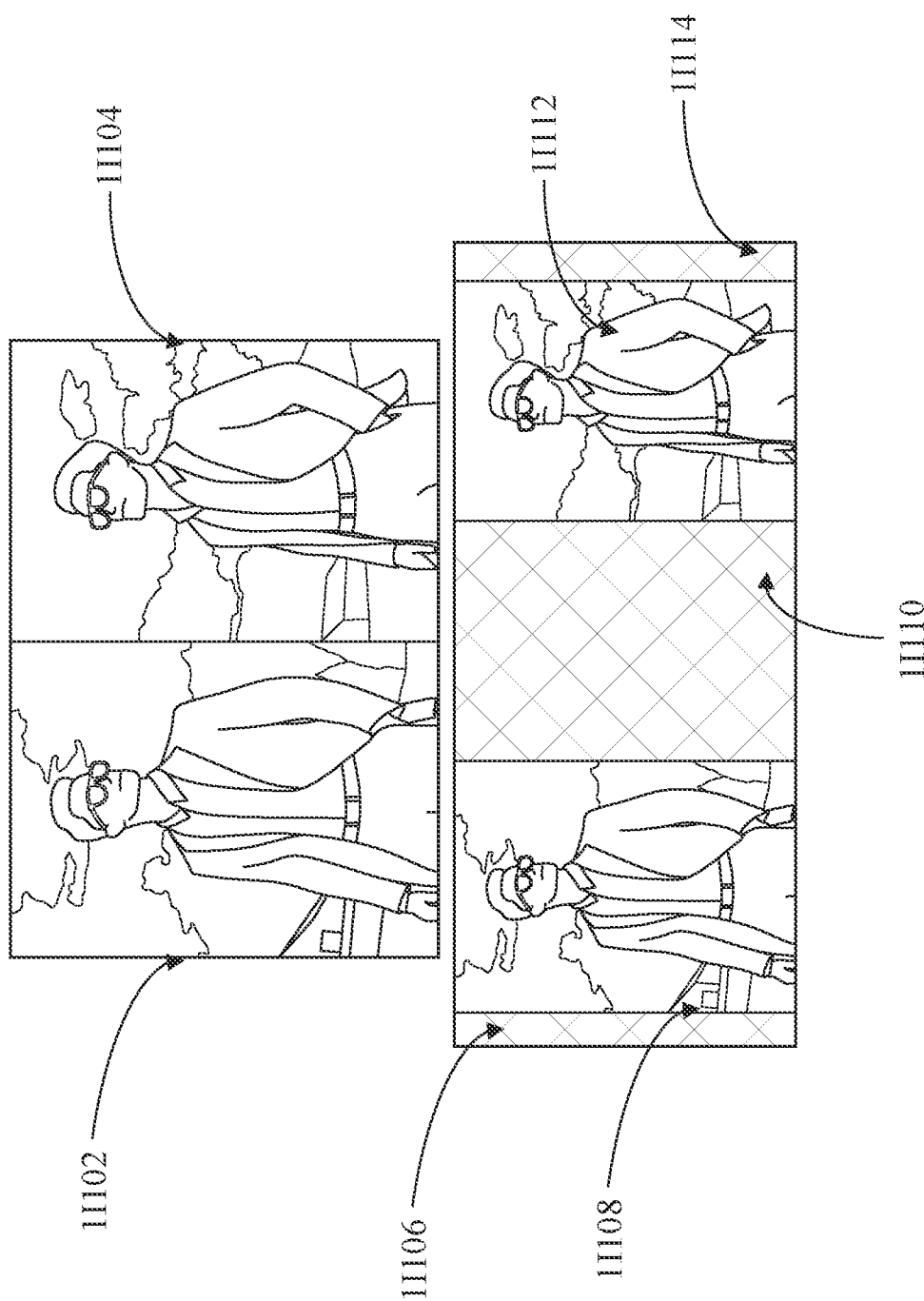

FIG. 1G and FIG. 1H are examples of customization. Suppose that a user is customizing a coffee mug 1H112 shown in FIG. 1H. Suppose that the user provided a picture (1G106 in FIG. 1G) of his child and would like to have the picture wrapped around the mug. However, suppose that the ratio of the picture's height/width and the ratio of the mug' height/circumference are different. In such a situation, the picture provided by the user would have to be extended to the sides without changing the ratio of the picture. At the same time, the extensions (i.e., the inpainting areas) would need to have at least some properties similar to those in the picture of the child.

Referring to FIG. 1H, the picture of the child along with the happy-camper flyer needs to be extended to meet the size of the mug. According to the example depicted in FIG. 1H, the areas that need to be extended may include areas 1H102, 1H104, 1H106 to form an extended new image 1H108. The extensions, however, need to be generated using, for example, inpainting techniques, described later, to include the corresponding content that contains graphical elements that are coherent and cohesive with the adjacent portions of the original picture of the child and the happy-camper flyer.

In the example depicted in FIG. 1H, the extensions are synthetic images generated with images selected from, for example, a repository of images, the user-provided image, and the like. However, the selection of the images from the repository is based on, for example, a request or a query, as it will be described later. The synthetic images are digitally generated, and thus the synthetic image is different from any of the individual selected images.

In the example, depicted in FIG. 1H, the extension 1H102 (shown in gray color) is replaced with content 1H122, which includes the motive and design generated using the inpainting technique (described later) and uses elements that are cohesive with the content of the happy-camper flyer. The extension 1H104 (shown in gray color) is replaced with content 1H124, which includes the motive and design generated using the inpainting technique (described later) and uses elements that are cohesive with the content of the picture of the child. The extension 1H106 (shown in gray color) is replaced with content 1H126, which includes the motive and design generated using the inpainting technique (described later) and uses elements that are cohesive with the content of the picture of the child.

5.3. Neural Networks

At some level of abstraction, generating an image extension includes generating side images using the approaches implementing a computer neural network, such as a Convolutional Neural Network (CNN). Examples of CNNs are described in, for instance, https://www.ibm.com/topics/convolutional-neural-networks.

A neural network may be trained and used by an AI-based application to predict the side parts of an image such that the predictions are both visually and semantically consistent. This may include capturing spatial context in an image using deep learning.

A CNN is a specialized neural network for processing data that has a grid-like topology. The CNN network may be trained as a deep CNN to predict content for the sides of the image. The image input to a CNN can be thought of as a 2D grid of pixels. A corresponding image extension model may be configured to understand the semantic relationship between embeddings included in the image files and use those embeddings for downstream tasks such as image classification.

The use of AI tools to generate images has been proven to be quite effective and progressive. AI-generated images are used by the emerging AI art generators to advance the artists' work and creativity.

5.4. Stable Diffusion

One of the popular generative AI tools is Stable Diffusion (SD). The diffusion model is often used to generate photorealistic images and/or high-quality images. However, although SD can generate high-quality images, it does have its limitations. For example, it may not be able to fine-tune the output images until the desired visual effect is achieved.

One of the solutions is an approach that combines the SD methodology with the inpainting methodology (which for the purpose of this disclosure has been extended to an image side-extension approach, described before). With SD, the process of inpainting is quite straightforward; it includes uploading an image and providing a request that specifies certain attributes of the content to be generated for the side extensions.

While the present approach is not about inventing SD, the present approach uses the SD methodology as a tool to support the inventive aspects of the presented approach. Therefore, the disclosure herein includes a brief overview of the SD technology.

SD is a deep learning text-to-image model that is primarily used to generate detailed images conditioned on text descriptions. The model may also be applied to other applications such as inpainting, outpainting, and the like. SD may also be used to generate image-to-image translations guided by a text prompt. It was developed by Stability AI Inc. in collaboration with several academic researchers and non-profit organizations.

SD is a latent diffusion model used in deep generative networks. Hardware requirements typically include the requirements for a rather modest GPU with at least 8 GB VRAM. Access to cloud services is not required (which differentiates SD from other text-to-image models such as DALL-E and Midjourney).

SD uses a latent diffusion model (LDM) developed by the CompVis group at LMU Munich. Generally, the diffusion models are trained with the objective of removing successive applications of Gaussian noise on training images, which can be thought of as a sequence of denoising autoencoders.

Usually, SD consists of three parts: a variational autoencoder (VAE), a U-Net, and an optional text encoder. The VAE encoder compresses the image from pixel space to a smaller dimensional latent space, capturing a more fundamental semantic meaning of the image. Gaussian noise is iteratively applied to the compressed latent representation during the forward diffusion.

The U-Net block, composed of a ResNet backbone, denoises the output from forward diffusion backward to obtain a latent representation.

The VAE decoder generates the final image by converting the representation back into pixel space.

The denoising step can be flexibly conditioned on a string of text, an image, or another modality. The encoded conditioning data is exposed to denoising U-Nets via a cross-attention mechanism. For conditioning on text, the fixed, pre-trained CLIP ViT-L/14 text encoder is used to transform text prompts into an embedding space. The increased computational efficiency for training and generation is usually an advantage of LDMs.

SD is usually trained on pairs of images and captions taken from LAION-5B, a publicly available dataset derived from Common Crawl data scraped from the web. Typically, 5 billion image-text pairs are used that have been classified based on language and filtered into separate datasets by resolution, a predicted likelihood of containing a watermark, and predicted aesthetic scores such as subjective visual quality, and the like. The dataset was created by LAION, a German non-profit that receives funding from Stability AI.

The SD model may be trained on three subsets of LAION-5B: laion2B-en, laion-high-resolution, and laion-aesthetics v2 5+. A third-party analysis of the model's training data identified that out of a smaller subset of 12 million images taken from the original wider dataset used, approximately 47% of the sample size of images came from 100 different domains, with Pinterest taking up 8.5% of the subset, followed by websites such as WordPress, Blogspot, Flickr, and the like.

SD may encounter some issues with degradation and inaccuracies in certain scenarios. Initial releases of the model were trained on a dataset that consists of 512×512 resolution images, meaning that the quality of generated images noticeably degrades when user specifications deviate from its "expected" 512×512 resolution.

However, the version 2.0 update of the SD model later introduced the ability to generate images at 768×768 resolution, which allowed for overcoming some of the above-mentioned issues. The SDXL model, released in July 2023, allows generating images at 1024×1024 resolution.

Another challenge of SD relates to generating human limbs due to poor data quality of limbs in the LAION database. These challenges are sometimes referred to as the act of "eating spaghetti," or the act of "using a video game controller." It appears that the model is insufficiently trained to understand human limbs and faces due to the lack of representative features in the database, and prompting the model to generate images of such type can confound the model.

Fine-tuned adaptations of SD created through additional retraining have been used for a variety of different use cases, from medical imaging to algorithmically generated. The fine-tuning process is, however, sensitive to the quality of new data; low-resolution images or different resolutions from the original data can not only fail to learn the new task but degrade the overall performance of the model. Even when the model is additionally trained on high-quality images, it may be difficult for individuals to run models in consumer electronics, such as Nvidia's GeForce 30 series, which has only about 12 GB as a minimum of 30 GB of VRAM usually required.

To address the limitations of the model's initial training, end-users may opt to implement additional training to fine-tune generation outputs to match more specific use cases. There are three methods in which user-accessible fine-tuning can be applied to an SD model checkpoint (1) an embedding, (2) a hypernetwork, and (3) a DreamBooth. The present approach leverages a handful of Low-Rank Adaptation techniques (LoRAs) to accentuate certain lighting models that fall outside of the realm of typical SD processes when handling, for example, very light and/or very dark images. The LoRAs techniques allow fine-tunings based on the prevalence of white color in an image, as well as based on the prevalence of black color in the image. Using these in conjunction with other lighting information allows us to achieve a more polished and vibrant look of the image generated using the generative process. Additional background information for these techniques is provided in, for example, https://huggingface.co/blog/lora, https://i.redd.it/well-researched-comparison-of-training-techniques-lora-v0-v101e5grs6cal.png?s=cfb3d4eb7d253025ffc68f679174 0f7737604c84.

An "embedding" can be trained from a collection of user-provided images, and allows the model to generate visually similar images whenever the name of the embedding is used within a generation prompt. Embeddings are based on the "textual inversion" concept where vector representations for specific tokens used by the model's text encoder are linked to new pseudo-words. Embeddings can be used to reduce biases within the original model or mimic visual styles.

A "hypernetwork" is a small pre-trained neural network that is applied to various points within a larger neural network. Hypernetworks steer results toward a particular direction, allowing SD-based models to imitate the art style of specific artists, even if the artist does not recognize the original model. They process the image by finding key areas of importance such as hair and eyes, and then patch these areas in secondary latent space.

DreamBooth is a deep learning generation model that can fine-tune the model to generate precise, personalized outputs that depict a specific subject, following training via a set of images that depict the subject.

In the context of the approach presented herein, the SD approach utilizes the text-to-image model to generate detailed images conditioned on text descriptions.

5.5. Inpainting

With the advancements in AI image generation technology, SD inpainting has become useful in many image-processing applications. One of many applications of the inpainting techniques is the inpainting function which allows rendering extensions for the sides of an image.

Generally, inpainting refers to the process of replacing a portion of an image with another image based on a textual prompt. The process includes providing the original image, a mask image that outlines the portion to be replaced, and a textual prompt. Based on the provided images and prompt, the SD model can produce a new image that replaces the masked area with the object, subject, or environment described in the textual prompt.

Typically, inpainting is used for restoring degraded images or creating new images with novel subjects or styles in certain sections. Within the realm of architectural design, SD inpainting can be applied to repair incomplete or damaged areas of building blueprints, providing precise information for construction crews. However, for the purpose of this disclosure, inpainting is used to generate side extensions of images.

5.6. Synthesized Images

AI-based techniques utilized in this approach may include a variety of generative AI techniques (GAI). An example of such a technique is SD. In this context, SD may be used to generate a digital image context for a custom product without altering the custom product itself or changing a key that refers back to the product database version of the custom product.

Suppose that a custom product is a greeting card for Father's Day, as described in FIG. 1B. The card may include a photograph of a grandfather and his grandson. As shown in FIGS. 1B-1E, the photograph has a different height-to-width ratio than the greeting card. For example, as described in detail in FIG. 1B, while the height of the card and the photograph may be the same, the widths may be different. Most likely, a user may not be interested in stretching the photograph (and thus changing the ratio of the photograph) to meet the dimensions of the greeting card. The user might prefer that, for example, the photograph is centered in the greeting card, and the sides of the card not covered by the photograph be filled in using a background that has a design and color scheme styled based on the content of the photograph itself.

To generate the side fill-in images (i.e., extensions), collaboration system 100 may generate a request to AI-based image generator 180 for generating the side fill-in images. Examples of the requests are described later.

The on-the-fly generated images may be synthesized from a large set of selected pictures stored in the repository. Such AI-based generated images may be included in the side areas of, for example, the photograph in the greeting card, as described in FIG. 1B.

In some implementations, the approach includes defining regions of interest within that product based on the layers that are included in the design itself. Further, the metadata associated with the design and the image can be used to determine the metadata associated with the image, a background area, and background color down to the bottom, text areas, and the like. That information can be used to determine the areas that need to be filled in using content obtained via generative AI processes to retain the intent of the user's design while preserving the concept of the layout, pattern, and design.

To allow customization of a product, computer collaboration system 100 (described in FIG. 1A) may use one or more graphical representations of the product, and several masks used to select areas within a depiction of the product that can be customized, filled with synthetic AI-based images, and several maps to implement lighting models, light reflections and the like. The representations, masks, and maps are typically used to make the depictions of the products more attractive, more realistic, and more related to the users' interests.

A few masks may be used. A mask is a binary mask that allows distinguishing a depiction of the custom product from the background. The mask may be used to, for example, mask a depiction of the user-provider picture, and to allow customizing the sides, i.e., extensions.

In other implementations, the masking convention may be reversed, therefore the masks may correspond to the reversed purposes, and thus the effects of their applications may be reversed.

To generate on-the-fly images using the described approach, first, a textual query may be generated. The query may include several keywords or phrases or the like. The keywords/phrases may be determined based on a product description of a custom product, information extracted from a user's profile, a history of the searches performed by a user, and the like. This may also include defining the context for a customization process performed on the custom product and then generating a combination of the context data and other keywords/phrases that can be determined from other sources.

A textual query may be provided to a generative AI-based application such as SD that generates output that may include one or more images. SD may be guided based on the input (i.e., the provided textual query) to provide synthetic images based on images derived from various databases.

6. Structural Description and Objective Measurement of Novel Use of Latent Diffusion Model-Based AI In some implementations, a Latent Diffusion Model Neural network is being used in the presented approach. Typically, there are two main inputs to Latent Diffusion Model Neural Networks. The inputs provide context to Text-To-Image Services.

6.1.1. Contextual Input Images

A contextual input image may be an image provided to Latent Diffusion Model Neural Networks. The contextual input image may have regions that, for example, are reserved, not to be replaced, but are used as context for a Latent Diffusion Model. These may be marked by an opacity mask or an alpha channel.

The contextual image may also contribute to the synthetic image but may be modified. The contribution may be marked by a partially opacity mask or alpha channel.

Furthermore, the contextual image may require a full image replacement or synthesis. These may be marked by a transparent portion of a mask or alpha channel.

The reserved regions of the input image may contain a rendered output of a custom product (as described, for example, in U.S. patent application Ser. No. 17/827,721). The contributing regions may contain lighting hints such as partial shadow for the rendered output of the custom product. The contributing regions may also include hints for how to shade the edge of a custom product. These may include shading for enhancing the edge as determined by objective requirements. These may also include coloring for the edge of the custom product edge as determined by objective requirements. Furthermore, these may include lighting for the edge as determined by objective requirements.

The reserved regions of the input image may be the output of a layout containing the design area for a custom product.

6.1.2. Text Input to Text-to-Image Service

Text input to a Text-To-Image Service may contain nouns or names of general classes of objects, as well as proper nouns such as the names of specific members of a class of objects. Examples of such nouns and names may include colors, times of day, types of lighting, and effects of light (such as shadows, reflections, fog, and the like). The examples may also include the name of the custom product or the subject of a design area for a custom product.

Text input to the Text-To-Image service may also contain adjectives or prepositional phrases in the text that modify the description of an object. These may include orientation of light and shadow such as "light from the top left," "overhead light with strong shadow," and the like. Examples of such adjectives and phrases may also include modifiers for color such as "pastel colors of purple and yellow," and the like. The examples may also include times of year and place, such as "a cold winter scene," "a warm summer's day at the beach," and the like.

That information may be included in, for example, requests that are generated and sent to an AI-based image generator. For example, the service may determine, for each region of an input image, a request comprising image encoding information of the custom image and information about a customization process for customizing the custom product. Including, for example, the image encoding information of the custom image and the information about the customization process for customizing the custom product, allows ensuring the high quality of a resulting image (i.e., a synthetic image generated by an artificial intelligence (AI) based image generator). Furthermore, such a request allows for ensuring that the resulting image is rendered efficiently and that the rendering is performed in almost real-time (on the fly), and therefore, the delay from providing the input image to the moment when the input image augmented with the synthetic image is rendered on a display device is as small as possible.

Then the service may cause an artificial intelligence (AI) based image generator to generate, based on, the image encoding information of the custom image and the information about the customization process for customizing the custom product, a customized synthetic image. The customized synthetic image may be used to fill in the particular region of the input image. Additional details of this approach are described later.

6.2. Requirements for Generating Image Regions

In some implementations, there are specific requirements for generating image regions using a Text-To-Image Service to integrate the image regions with a design for a custom product or a view of a custom product. One of the requirements may be that the lighting in the Text-To-Image synthetic region surrounding a custom product matches the lighting used for rendering the custom product.

Another requirement may be that the color palette in the Text-To-Image synthetic region surrounding a custom product matches the color palette specified for representing the custom product.

Other requirements may be that the color palette in the Text-To-Image synthetic region used in a Design Area for a custom product matches the color palette specified for that Design Area. If the custom product or the design is associated with a Moment, that is, a specific event with a time of day, time of year, or a place context, then the time and place represented in the Text-To-Image synthetic region represent the lighting, color, and place specified for that Moment (as described, for example, in U.S. patent application Ser. No. 17/827,721).

6.3. Automatic Objective Measures

There are automatic objective measurements that may be performed on the portion of an image generated using a Text-To-Image Service to test if, for example, it meets certain requirements. For example, the Palette of the image portion may be determined. Furthermore, its closeness to the palette specified for a custom product view, or for a Design Area of a custom product may be measured.

Other measurements may include the measurements of light and shadow of the image portion, and its closeness to the shadow rendered for the custom product may be measured.

Additional measurements may include the measurements of the edge quality of the image portion may be determined, and its closeness to the edge quality required for the custom product may be measured.

According to the presented approach, the method includes determining the above-listed different objective measures of an image, and using the image only if at least one or two of the measures fulfill a corresponding quality criterion threshold.

6.4. Objective Improvements

In some implementations, the presented approach provides several objective improvements in using a Text-To-Image Service over existing automated methods. For example, in the existing method, an image portion to be used as context for a custom product view may be selected using the following automated approach. The automated approach may include assembling image tags from a set of available image tags to describe the objects, setting, lighting, and color for an image search.

Furthermore, an optimized search may be performed on a database of stock images for likely candidates based on the tags associated with each stock image in the database. The optimized search may return several images. A final image may be chosen from the likely candidates based on a comparison of the image palette with the required palette. Since stock images are fixed, a match may be found that meets all of the objective measures in the examples above is quite unlikely.

The Text-To-Image Service may be used for a custom product view in the following manner: an image input may be constructed so that the reserved portion of the input image contains a rendering of the custom product. The contribution portion of the input image usually contains a partially opaque rendering of the required shading and shadow treatment for the edge of the custom product. The contribution portion of the input image may also contain a partially opaque rendering of the palette of colors required for the custom product.

In some implementations, the input text string may be constructed in such a way that the input text string includes the time of day as required by the Moment of the product view represents. Furthermore, the input text string includes the time of year as required by the Moment that the product view represents. The input text string includes the place as required by the Moment the product view represents. Furthermore, the input text string includes the direction of light as is encoded in the rendering method for the custom product. In addition, the input text string includes the quality of shadow (e.g., softness, hardness, and the like) as is encoded in the rendering method for the custom product. Moreover, the input text string includes a listing of objects that are required to be present for the representation of the Moment. Other approaches for determining the input text string may also be implemented.

6.5. Requests

There are several ways of generating requests for providing synthetic images. One way includes specifying textual requests that include keywords and/or phrases specifying the theme or genre of the requested synthetic image. Other ways may include providing a sample image, or sample images that are in the same, or similar, genre as the requested synthetic image. Other ways of requesting a particular synthetic image can also be used.

A textual request for providing a synthesized, AI-generated image may be generated using many different approaches. According to one approach, keywords and phrases for the textual query may be generated based on a product definition of a custom product itself.

By selecting keywords/phrases for a request (i.e., for a query) from the content of a product definition of the custom product. By doing so, the computer collaboration system (e.g., system 100 in FIG. 1A) does not change the actual definition of the product itself. Instead, the system accesses the entire context, which in this case includes definitions of both the background and the custom product itself. Continuing with the Father's Day example in FIG. 1B-1E, this may allow accessing, removing, or modifying individual context of the objects shown in the depiction of the custom product, such as accessing, removing, or modifying the context for a photograph, sides of the photograph, and the like.

Keywords/phrases for a textual request may be obtained from, for example, key-value pairs that are included in the product definition of the custom product. A key-value pair is a pair that captures a certain characteristic of the custom product, and each custom product may have hundreds, if not millions, of the associated key-value pairs. An example of a key-value pair may include a pair (color, red), wherein the term "color" is a characteristic key, while the term "red" is a value of the characteristic key. Key-value pairs are described in detail later.

Keywords/phrases of a textual request may be viewed as a collection of different information that was extracted either from the product itself based on the key-value pairs or based on tags attached to the product.

Keywords/phrases may also be extracted from, so-called, associated data, including a set of key values for creating the product and associating the product with various groups, including social groups, and the like. For example, a custom product such as a coffee mug may be associated with various social groups, such as a "relaxation" social group, a "family" social group, and the like.

Keywords/phrases of textual requests may also be edited by modifying them using information included in the associated events, user groups, event groups, and the like. For example, if a user's profile indicates that the user such as is a teacher and is planning a trip to Santa Cruz Beach, then the keywords/phrases for a corresponding textual request for synthetic AI-generated images may also include words such as beach, Ocean, sand, and the like.

Referring to FIG. 1E, an example request may be "grandfather and grandson playing on grass." Referring to FIG. 1F, an example request may be a "colorful abstract pattern." Referring to FIG. 1H, an example request may be "child on a swing with lake and forest in the background."

Keywords/phrases textual requests may also be determined based on the information about the attendees, and the physical location of the event. This type of information is usually a rich set of information associated with the product through the key values, the product, the moment, or the central use with which the product is associated. That can also include a description of key values and structure around the Zazzle "moments" patents such as U.S. patent application Ser. Nos. 18/120,403; 18/120,404; 18/120,405; 18/120, 406; and Ser. No. 18/120,407.

Keywords/phrases for textual requests may also be determined based on the user's profile. For example, if a user's profile includes information about the race and/or gender of a user, then the race/gender information may be used as keywords for a textual request. Furthermore, if a user's profile includes a user's location, a user's city, and the like, then that information may be used as keywords for a textual request.

7. Extensions for Multiple Images

FIG. 1I is an example of customization. In the depicted example, the custom product is a mug (shown in FIG. 1J). A user provided two images 1I102 and 1I104. To wrap the mug with the two images (1I102 and 1I104), the images need to be extended. An example of an extended image includes an extension image 1I106, image 1I108, an extension image 1I110, image 1I112, and an extension image 1I114.

In the next step, extension images 1I106, 1I110, 1I112, and 1I114 are replaced by actual synthetic images. The synthetic images may be generated using techniques such as SD and inpainting, as described before.

Figure 1J:
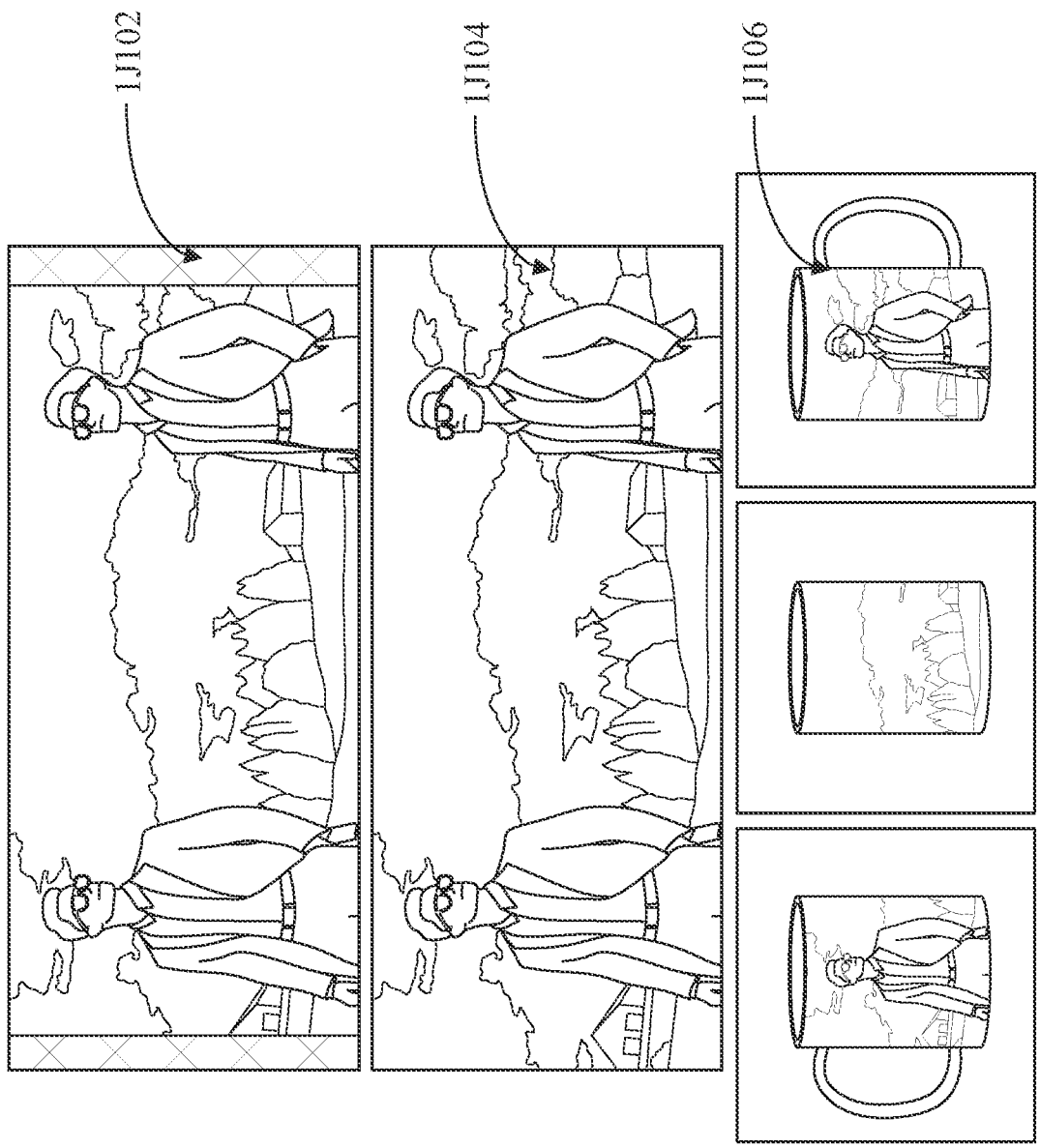
FIG. 1J is an example of customization.

FIG. 1J is an example of customization. FIG. 1J shows that a central portion of image 1J102 has been filled in using a synthetic image generated using the inpainting technique. It should be noted that the central portion of image 1J102 includes content that was not in the user-provided images; however, the central portion of image 1J102 contains content that includes objects, colors, and color schemes that are cohesive with the themes depicted in the user-provided images.

In the next step, side portions of image 1J104 are filled in using synthetic images generated using the inpainting technique. It should be noted that the side portions of image 1J104 include content that was not in the user-provided images; however, the side portions of image 1J104 contain content that includes objects, colors, and color schemes that are cohesive with the themes depicted in the user-provided images.

In the next step, a resulting image 1J106 is wrapped around the custom product, i.e., the mug. It should be noted that the user-provided images are separated using synthetic images that transmit smoothly in terms of colors, color schemes, and the like.

FIG. 1K and FIG. 1L are other examples of customization. Suppose that a user provided two images that he would like to have applied to a bag. Using the inpainting techniques described above, the images may be used to generate a resulting image 1K102, in which one image is placed at the bottom of 1K102, another image is placed at the top of 1K102, and the remaining areas (i.e., side areas) are filled in using synthetic images.

Once image 1K102 is applied to bag 1L102, shown in FIG. 1L. Also shown in FIG. 1L, an open bag 1L104 includes the resulting images 1K102. It should be noted that various colors from the bag can be used to generate synthetic images. For example, a piping color, a reference color, a trim color, and the like may be used as portions of a request sent to an SD/inpainting application.

Piping and trim colors may be automatically set to match an element in the imagery. In this example, the color is set to match the woman's navy shirt. Other ways of deriving keywords/phrases for textual requests for synthetic AI-based images may also be implemented.

Figure 1M:
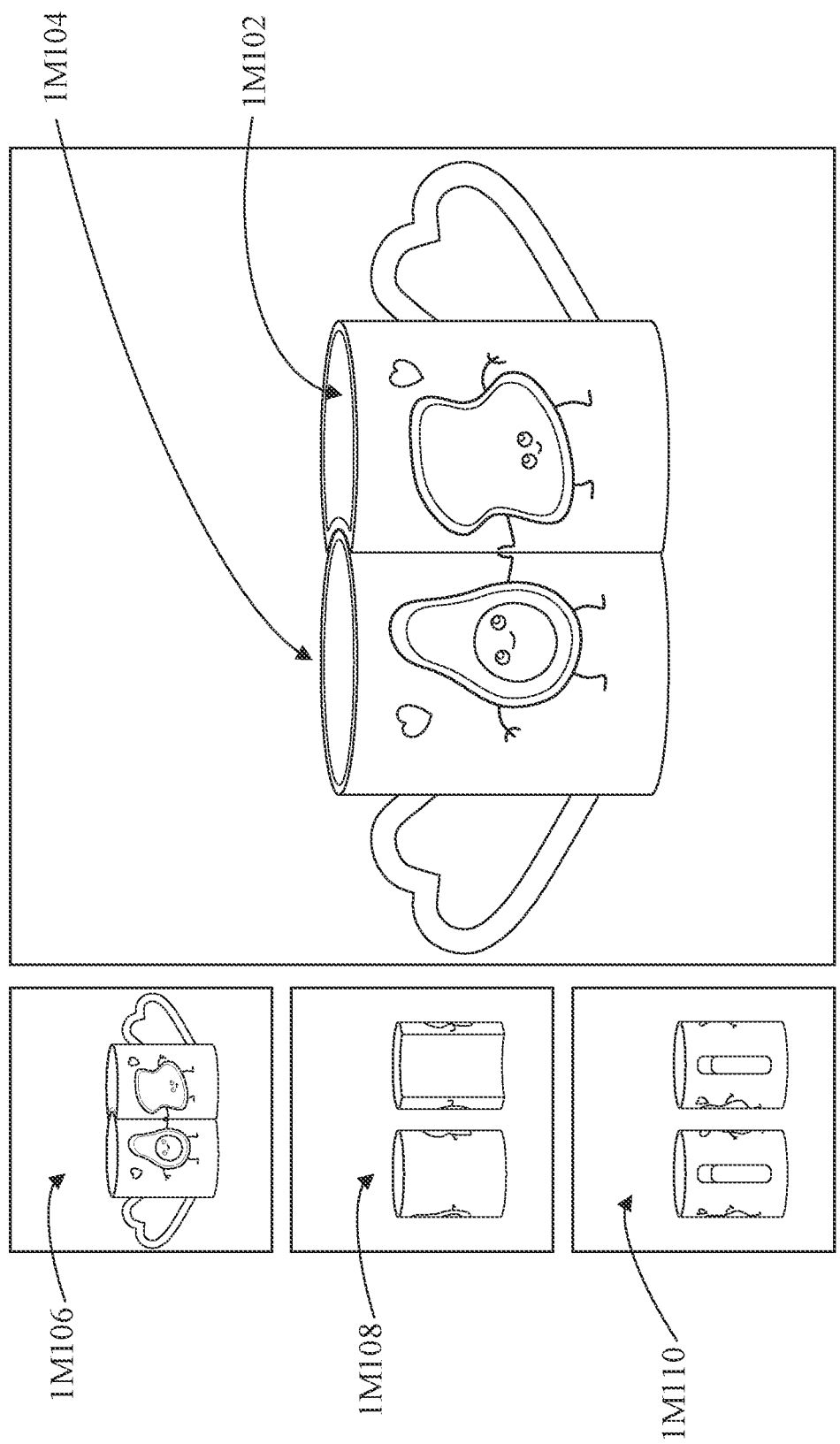
FIG. 1M is an example of customization.

FIG. 1M is an example of customization. The example shows two twin mugs 1M102 and 1M104. The twin mugs may be considered as one custom product (including the two mugs), or as two matching separate mugs that are customized or decorated similarly.

On the left side of the example shows in FIG. 1M, the twin mugs are shown in different views: a front view 1M106 shows the twin mugs with the synthetic images showing on their front sides; a back view 1M108 shows the back side of the twin mugs; and a side view 1M110 shows the mugs from the mugs' handles side.

The decorations on the twin mugs are generated using the approach that includes generating multiple synthetic images and applying the multiple synthetic images to multiple components of a custom product, i.e., twin mugs. The approach may include determining a plurality of image elements in a custom image based on one or more characteristics associated with image elements of the plurality of image elements. If the custom image is, for example, a picture of an "avocado" and a picture of "toast," then the plurality of image elements may include an image of the avocado, an image of the toast, an image of the background, and the like.

The approach may also include determining a plurality of product components of a custom product. If the custom product is, for example, the twin mugs, then the plurality of components may include the front side of one mug, the front side of the second mug, the back side of one mug, the back side of the second mug, a background area of one mug, a background area of the second mug, and the like.

The approach may also include determining a subset of the plurality of product components of a custom product. Continuing with the twin mug example, the subset of the plurality of product components for the twin mugs may include, for example, the front side of one mug, the front side of the second mug, and the like. Furthermore, the approach may include selecting, for each component of the subset of the plurality of product components of the custom product, one or more second image elements, from a plurality of images, based on element characteristics, from the one or more element characteristics, associated with the one or more second image elements. Continuing with the twin mug example, one image may be the image of the avocado, while the second image may be the image of the toast.

Based on the subset of the plurality of product components and the one or more second image elements, a request for customizing the subset of the plurality of product components of the custom product is generated. Various ways of determining the request are described later.

The approach may also include transmitting the request to the AI-based image generator to cause the AI-based image generator to generate, based on, at least in part, the request, a customized synthetic image for the product component. Therefore, the customized synthetic image is generated based on, e.g., one or more image elements from two or more images. Continuing with the twin mug example, the customized synthetic images may include a synthesized depiction of the avocado and some background, such as an arrangement of hears. Another synthesized image may include a synthesized image of the toast and some background, such as another arrangement of hearts. These synthetic images may be applied to the individual product components, such as the front side of the one mug and the front side of the second mug, respectively.

The different views of the twin mugs customized using the synthesized images described above may be displayed, on a display device, as graphical visualizations of the custom product. In FIG. 1M, the different views of the customized twin mugs are described in 1M106, 1M108, and 1M110, and the like.

8. Base Images

Base images, such as a base product image 1B102, may be obtained using different approaches. One approach includes taking photographs of a custom product in specific lighting conditions and using cameras that usually have a high resolution and a high contrast.

This process may include preparing a display of a custom product, setting up the light sources, determining an ambient light, and other lighting conditions that are useful and favorable for depicting the product. In some implementations, a photographer takes a picture of the physical object displayed on a white-background screen. The scene is illuminated using several light sources. The light is also reflected from screen panels and the like.

Another method for obtaining a base image of a custom product may also be implemented. For example, a base image may be a synthetic image, a digital 3D model, and the like.

9. Generating Synthetic Images Using AI

9.1. Requests

Figure 2A:
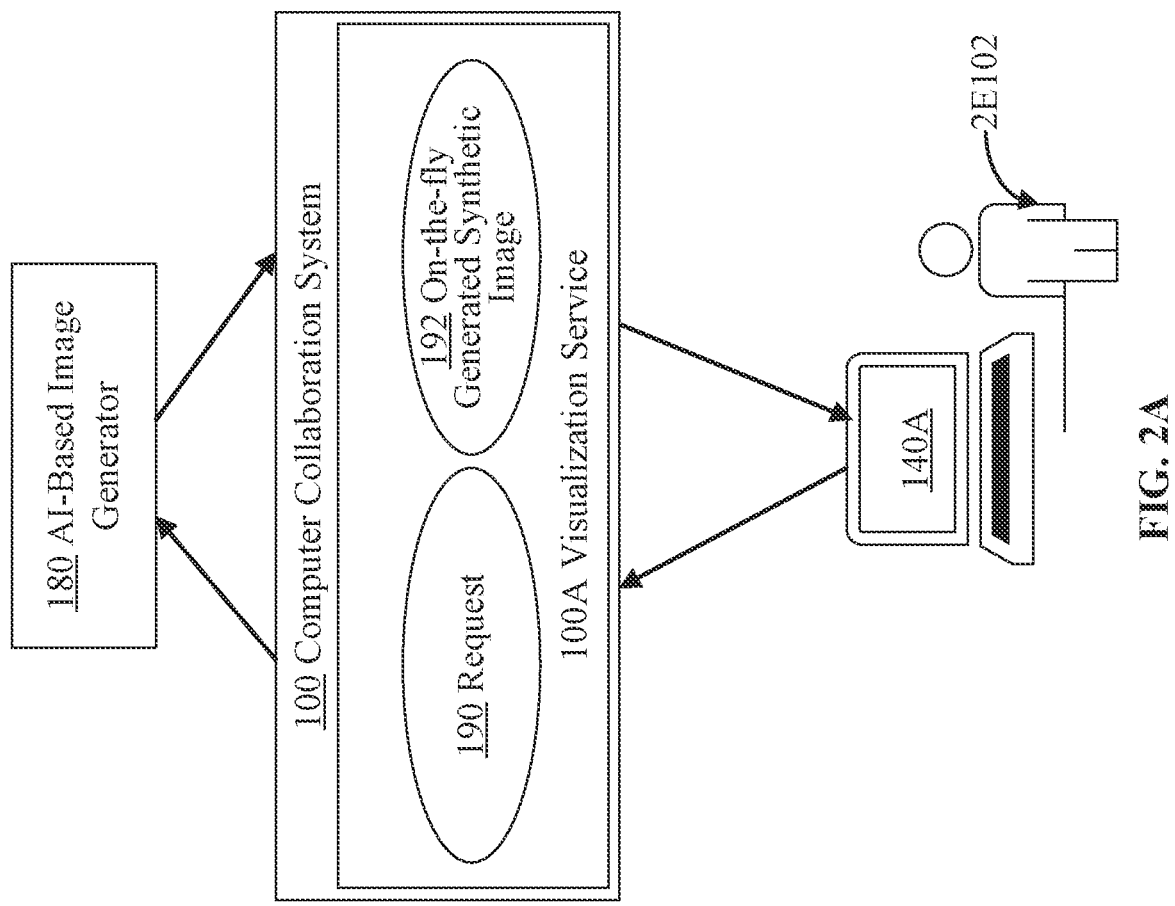
FIG. 2A is an example of utilizing an AI-based image generation approach.

FIG. 2A is an example of utilizing an AI-based image generation approach. In the depicted example, synthetic backgrounds and images may be generated as a product of collaboration between computer collaboration system 100, AI-based image generator 180, a user 2E102 operating a user computer 140A.

In some embodiments, computer collaboration system 100 uses its visualization service 100A to communicate with AI-based image generator 180.

User computer 140A may be used to receive customization requests from user 2E102, selections of custom products, and other requests to computer collaboration system 100. User computer 140A may also be used to display graphical visualization of custom products, including the visualization of on-the-fly generated AI-based images that have been merged with, or incorporated into, the visualization of the custom products.

Computer collaboration system 100 (or its visualization service 100A) may receive a graphical representation of a custom digital product, such as a pottery product, a linen product, a card, a print, a drawing, and the like. The graphical representation for a product may include encoded information about the product, and the product description—including the key-value pairs described later.

In some embodiments, a graphical representation of the custom digital product comprises product description data for a custom digital product. The product description data comprise a plurality of parameters of the custom digital product, and each parameter, of the plurality of parameters of the custom product, is a key-value pair. A key-value pair is a data structure that includes an attribute key and a corresponding attribute value.

Based on the received product description, as well as the user's profile, events, and the like, visualization service 100A determines one or more regions within the depiction of the custom product. The regions may be customized when displaying the graphical representation of the custom digital product on a display device.

A region may be determined based on the information included in the graphical representation of the product, the key-value pairs, a user's profile, and the like. The regions may include the background to be shown behind a depiction of the product, or other regions to be shown behind a depiction (or depictions) of the product or within the depiction of the product. For example, if a product is a Christmas card, then a region may be a background region displayed behind a depiction of the customized Christmas card. According to another example, if a product is an invitation card, then one region may be a region that is to be displayed above a depiction of the invitation card, while another region may be a region that is to be displayed on the invitation card itself.

For each region, visualization service 100A determines a set of keywords/phrases that are specific to the custom digital product and to the customization of the custom digital product. The set of phrases may include one or more key-value pairs extracted from the product description data. The set of phrases may also include one or more pieces of information extracted from a user profile of a user who customized the custom digital product. The set of phrases may further include one or more pieces of information extracted from a repository of events associated with the custom digital product. Various ways of deriving the keywords/phrases were described before.

For each region, the corresponding keywords/phrases may be used to create a request 190.

A request may be a textual request and may pertain to the particular region for which the request has been created. The request is also referred to as a synthetic image generation request. It is possible to generate several requests for one region.

All the requests may be transmitted by visualization service 100A to an AI-based image generator.

9.2. AI-Based Image Generator

AI-based image generator 180 is configured to receive requests for synthetic (or synthetic) images, generate synthetic images in response to receiving the requests, and provide the generated synthetic images to visualization service 200A.

Figure 2B:
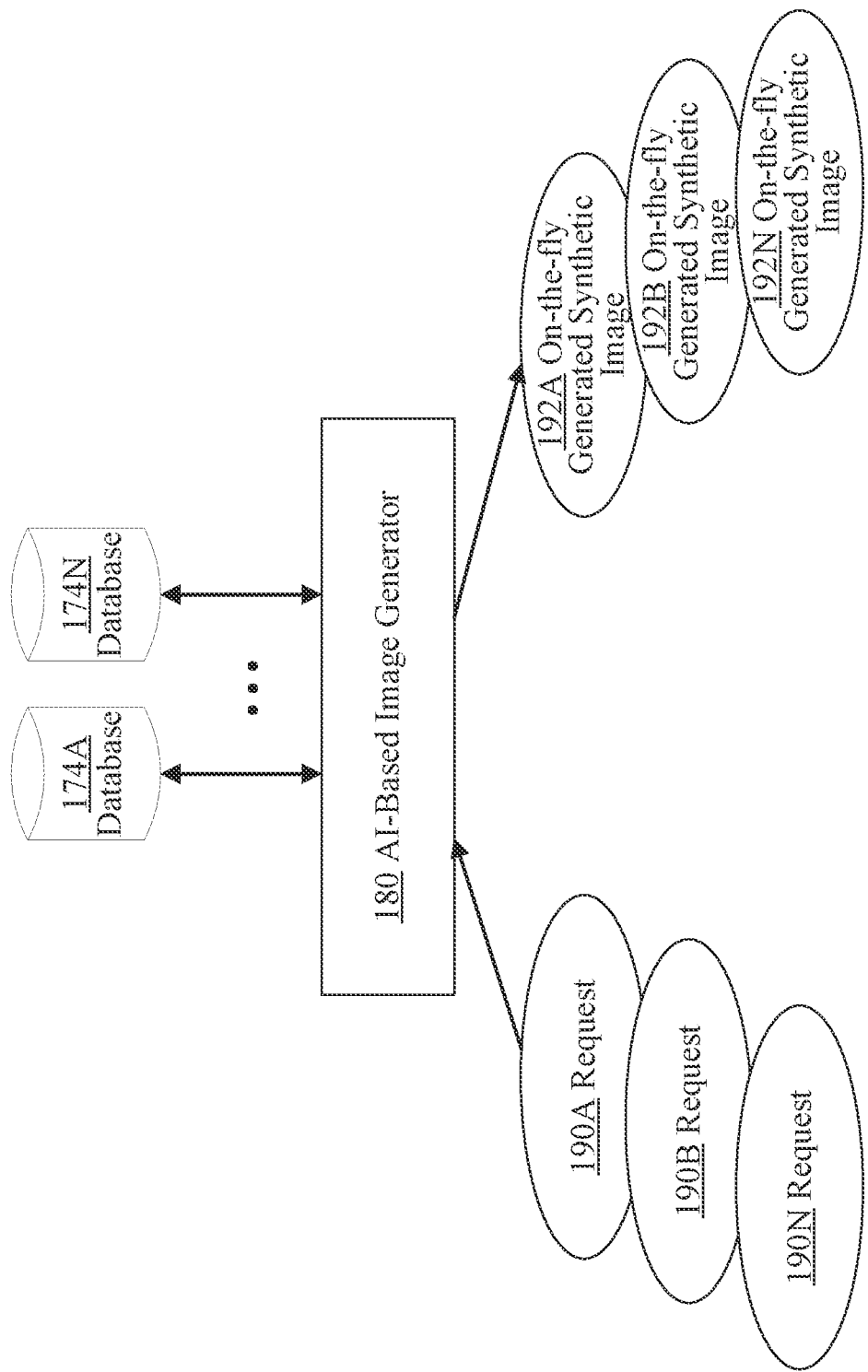
FIG. 2B is an example of an AI input and a corresponding AI output to be merged with a customized image.

FIG. 2B is an example of an AI input and a corresponding AI output to be merged with a customized image. For a given customization image, AI-based image generator 180 may receive a plurality of requests 190A, 190B . . . 190N. The requests may pertain to one individual region within the customization image; however, it is also possible that a plurality of requests is received for one individual region within the customized image.

AI-based image generator 180 may be configured to access one or more databases, such as database 174A, database 17, and so forth. A database may store SD-related files, repository images, training data, training models, learning models, and the like.

In response to receiving requests 190A-190N, AI-based image generator 180 may generate one or more on-the-fly generated synthetic images 190A-190N.

9.3. Synthetic Images

Synthetic images may be generated based on the keywords/phrases included in the corresponding request. For each request, one or more synthetic images may be generated. As described before, each on-the-fly synthetic image is generated from one or more images that have been retrieved from database(s) 174 and synthesized. Therefore, none of the synthetic images 190 looks like any of the images stored in the repository.

For each request 190, upon receiving the request, AI-based image generator 180 generates a customized synthetic image based on, at least in part, the request and a repository of images, as described earlier. The customized synthetic image is not a copy of any image from the repository of images. Instead, the customized synthetic image is generated by synthesizing a set of images that an AI-based image generator selected from the repository of images and by synthesizing the selected images using the SD approach, described earlier.

A customized synthetic image may be generated by synthesizing two or more images extracted from the repository of images that are tagged with phrases matching one or more phrases in the set of phrases. The images in the repository of images may be tagged using corresponding tags. The customized synthetic image is generated contemporaneously by updating a display of the custom digital product on the display device. That is why they are referred to as on-the-fly generated synthetic images.

Referring again to FIG. 2A, once the customized synthetic images are generated by AI-based image generator 180, the generator transmits the images to the computer collaboration system 100 and the virtualization service stores the images as on-the-fly generated synthetic images 192.

Upon receiving on-the-fly generated synthetic images 192, visualization service 100A matches the received images with the corresponding regions, includes the images in the corresponding regions, and generates a graphical visualization of the custom product and the corresponding synthetic images.

Then, visualization service 100A displays, on the display device, the graphical visualization of the custom digital product along with the customized synthetic images in the corresponding regions.

The graphical visualization along with the graphical representation of the custom digital product may be transmitted, or otherwise provided, to a manufacturing product rendering unit of a manufacturing entity. The manufacturing product rendering unit may render the graphical visualization and representation of the custom digital product, and, for example, print, using printing instructions of a manufacturing product rendering unit, the graphical representation of the custom digital product to generate a physical representation of the custom digital product.

10. Example Manufacturing System

In some implementations, an approach for using a product as a key for context-based image generation of high-quality rendering and generating manufacturing output of custom products is implemented in a product collaboration platform. The platform allows users, designers, customers, and support engineers to, for example, design and create digital designs of products. An example computing environment for the process of creating digital designs, manufacturing products, and the like is described later in FIG. 3A.

10.1. Structural Description of Authoring Tools

In some implementations, a product visualization platform is configured to execute one or more software applications designed to generate high-quality renderings and manufacturing outputs of custom products. Generating high-quality renderings and the outputs may include performing several visualization tasks and production tasks. The tasks may be performed by executing the software applications as a set of sequential and/or parallel processes. As will be explained later, the applications are also referred to as authoring applications or authoring tools.

The authoring tools may receive, as input, an initial description of a product that is to be displayed by the platform and then made available for customization. From the initial description, the tools may generate layouts, or manufacturing files, that include a high-level representation of how the product is to be made or embellished and what customizable parts the product has. The layouts and manufacturing files are described later.

Manufacturing files may also include, for example, markups, and the files with markups may be sent to a manufacturer. A markup may be a two-color checkerboard pattern comprising a plurality of squares, where each square is of a single color and each adjacent square is of an opposite color. For example, a markup may be a two-color checkerboard pattern comprising solid-colored squares, where each square is of a single color and each adjacent square is of the opposite color. A markup portion of an input image may be partitioned into a set of regions, where each region of the set of regions represents a single corresponding square of the markup. In other embodiments, the markups may include different patterns, shapes, or colors. The markups have been disclosed in, for example, U.S. Pat. Nos. 9,852,533 B2 and 10,283,165 B2.

In response to sending the manufacturing files for a product to a manufacturer, the manufacturer may generate a physical product containing the markups and may send the physical product to the platform's operators.

Upon receiving the physical product with the markups, the platform's operators may take, using for example digital cameras, a set of high-quality photographs depicting the physical product and the corresponding markups. The photographs are then provided as input to the authoring tools executing on the platform. For example, the photographs containing the markups may be provided as input for generating, for example, various views of the product, and depicting the product having different finishes, different patterns, different colors, different shadings, and the like.

In some implementations, the visualization platform uses various views (e.g., configurable images, layouts, and design views (described later)) to depict the product and to allow generating output, which then can be, for example, displayed on the website generated by the visualization platform and made available to customers for personalization, customization and potentially purchasing. Different views are described later.

Various depth maps and laser-based imagery may also be used. Examples of devices that capture information about a product's physical appearance or construction may include cameras, scanning devices (such as laser scanners, iPhones (Time of Flight imaging), Kinects (structured infrared light pattern), and the like. Depth maps (generated using, for example, Microsoft's Kinect hardware and laser scanners may be used as scanning devices in testing and asset production. In the context of this disclosure, they operate similarly to, for example, a camera. They may be configured to capture the product's physical attributes or surface characteristics. The depth maps and laser scans may then be used in asset generation in the authoring tool.

If a customer finishes customizing a product and, for example, places an order for the product, then the data describing the custom product may be transmitted to, for example, a print server. The print server may use the data to generate a manufacturing output file. The output file may contain manufacturing instructions, which a manufacturer may use to manufacture the custom product as ordered by the customer. The manufacturing instructions are described later.

10.2. Designing an Asset

In some implementations, a product visualization platform is configured to execute software applications designed to generate high-quality renderings and manufacturing outputs of custom products. The high-quality renderings may be used to, for example, generate depictions of various products and the products' components. The products are also referred to herein as assets. The assets may be displayed on a website or other service where a user may interact with digital files featuring the assets and facilitating the personalization, customization, and ordering of the product by customers. The customizing of the products may involve, for example, employing high-quality renderings to be able to display the products using functionalities of the website or the chosen display service.

However, before a high-quality rendering of an asset may be generated, the asset needs to be designed and then a test needs to be performed to determine whether a manufacturer can manufacture a physical product corresponding to the asset according to the designer's specifications.

10.3. Asset Definition Data

Asset definition data is the data that parametrically describes an asset and/or a custom product. In some implementations, the asset definition data includes the Product Description Key-Values as disclosed in, for example, U.S. patent application Ser. No. 17/458,116, U.S. patent application Ser. No. 17/501,513, U.S. patent application Ser. No. 17/387,154, U.S. patent application Ser. No. 17/384,636, U.S. patent application Ser. No. 17/501,451, U.S. patent application Ser. No. 16/867,898, and U.S. Pat. No. 11,080, 912.

In addition to the Product Description Key-Values, manufacturing constraints may also be used. The manufacturing constraints may be used to set forth the metes and bounds for the equipment employed by the manufacturers involved in producing the products. The manufacturing instructions are usually compatible with the configurations of, for example, manufacturing servers, such as print servers, that process the manufacturing instructions and generate outputs that meet the requirements of the customer settings.

Manufacturing instructions usually capture all the information that needs to be provided to a manufacturer so that the manufacturer can produce/manufacture a product that was customized by a user and/or a designer. The manufacturing instructions capture the key-value pairs (described in detail later) in a form that is understandable by the equipment deployed by the manufacturer. As it will be described later, two or more custom products may have their sets of key-value pairs; however, not all, but some of the key-value pairs in the corresponding individual sets of the key-value pairs may be the same. For example, a collection of coffee mugs having a particular floral design imprinted on the mugs of the collection may share or have similar, subsets of the key-value pairs that capture the details of the particular floral design.

Certain details of a group of certain custom products may be captured by a subset of the key-value pairs that may be specific to every certain custom product. That subset of the key-value pairs may be included in, a so-called, dictionary and labeled as reusable key-value pairs. The dictionary may be stored in a storage or a memory unit by, for example, a product customization platform, which is described later.

Similarly, one or more certain manufacturing constraints of a plurality of manufacturing constraints for manufacturing a group of certain custom products may be specific to every certain custom product. One or more certain manufacturing constraints may be included in the dictionary and labeled as reusable manufacturing constraints.

Realistically, during conversations with a manufacturer, it might be difficult to describe the necessary manufacturing constraints in the way that a product that the manufacturer manufactured would match the custom product (described using the key-value pairs). Therefore, there is a need to use the dictionary with the labeled particular manufacturing instructions (corresponding to a subset of the certain key-value pairs), and then select a short list of the manufacturing instructions, selected from the labeled particular manufacturing instructions, and use them as a starting point to capture the characteristics of the custom product. Then the manufacturing instructions from the shortlist may be refined and further fine-tuned until the accurately manufactured product can be produced.

10.4. User Devices

Figure 3A:
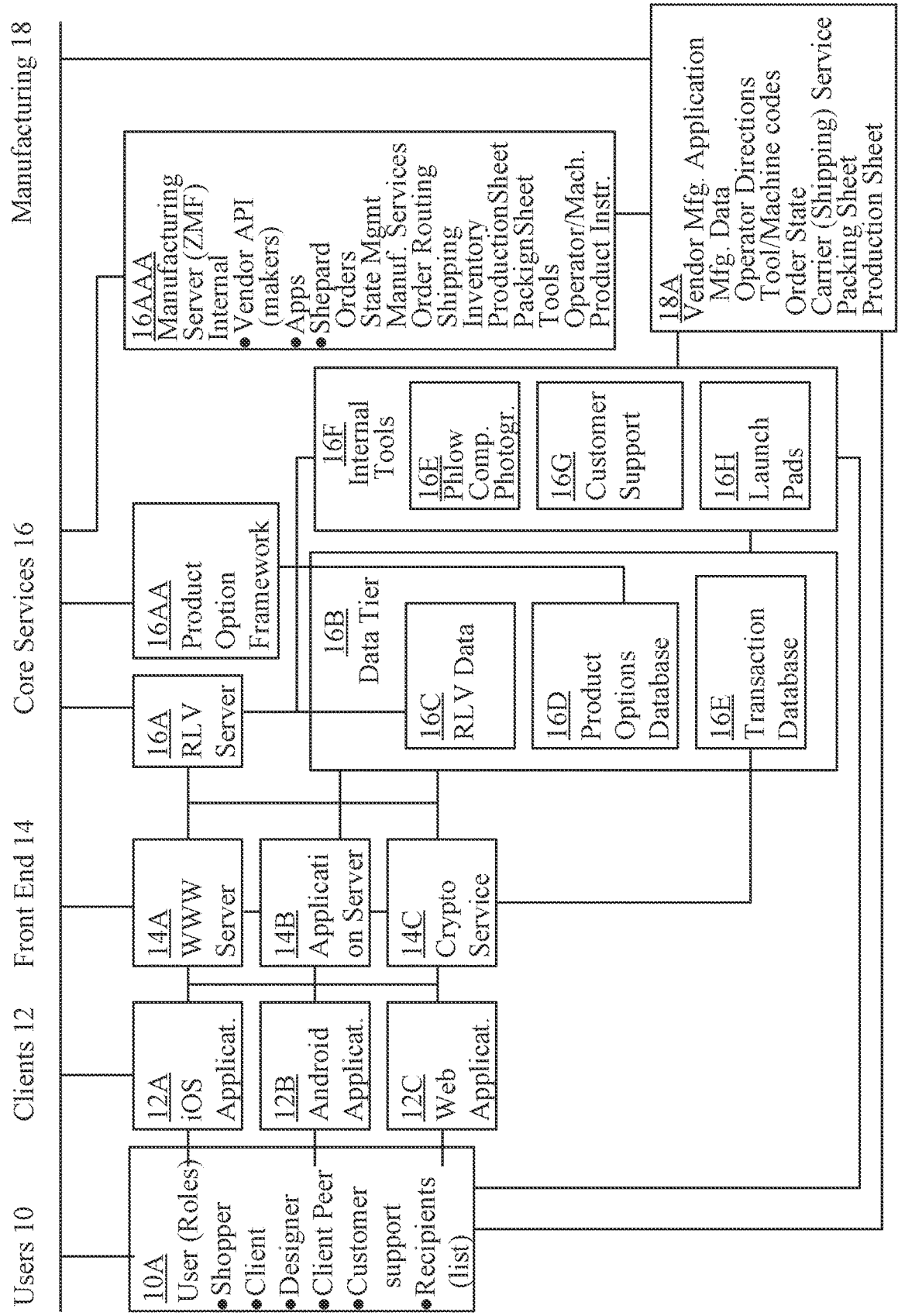
FIG. 3A is a block diagram showing an example environment for designing and manufacturing products.

FIG. 3A is a block diagram showing an example environment for designing and manufacturing products. FIG. 3A depicts several examples of users 10. Each of the users 10 may use its own or shared, computer device. Examples of user devices are described later in FIG. 3B (see devices 140A-G).

In some embodiments, examples of user 10 are determined based on the roles that may be assigned to the users. Examples 10A of roles may include a shopper, a client, a designer, a client peer, a customer support engineer, a recipient, and the like.

10.5. Client Applications

Clients 12 in FIG. 3A refer to client applications that are implemented in client servers 14 and that are configured to support requests received from users 10A. Non-limiting examples of clients 12 may include iOS applications 12A, Android applications 12B, Web applications 12C, and the like.

10.6. Frontend Servers

Frontend servers 14 refer to computer-based servers that are configured to process requests received from clients 12 and in many cases interact with core services 16 to further resolve these requests. Examples of frontend servers 14 include one or more WWW servers 14A, one or more application servers 14B, and one or more cryptographic servers 14C. Cryptographic servers 14C may be configured to provide cryptographic services for encrypting/decrypting, transmitting, or otherwise communicating data between the entities depicted in FIG. 3A.

10.7. Core Services

Core services 16 in FIG. 3A refer to servers and services implemented in a role-based collaboration platform configured to provide functionalities for creating and designing digital designs, handle collaboration requests, and facilitate the customization requests received from users 10.

In some embodiments, a customization process performed by a user, of users 10, and intended to generate a digital design of a custom product is captured in so-called product description data, which then may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and/or 3D patterns that may be used to cut, cast, or form physical components of physical final products. The patterns may be parametric, i.e., they may have parameters that, through encoded relationships, adjust the form of the pattern for a specific need.

For instance, a set of 2D patterns for a t-shirt graded based on size may become a parametric pattern by interpolating grade curvatures. A single parametric value may set this automatic grading. The single parametric value is usually called a 'size.'

The product instructions may also include models, including 2D and 3D models that are used to form, through additive manufacturing, or subtractive manufacturing, portions of a product. The models may be parametric, i.e., they may have parameters that, through coded relationships, adjust the form of the model for a specific need. For instance, a set of 3D models may represent a bike helmet. Each model may fit a statistically normed human head of a specific age. A coded relationship between the models may allow for interpolation of the set of models for a specific age. A single parametric value may set the automatic interpolation. The single parametric value in this case is usually called an 'age.'

The product instructions may also include material properties such as a physical material used to form a product from a pattern. Some material properties may be parametric, i.e., they may be selected or changed during the manufacturing time.

The properties may also include a body color. For instance, the color of a fabric may be selected for manufacturing a t-shirt. According to another example, the color of plastic may be selected for manufacturing a bike helmet.

The properties may also include a body texture such as the fabric weave of a t-shirt may be specified to be smooth or stubby. For instance, the surface of a plastic bike helmet may be polished or satin. Each property is necessarily specific to each class of materials. Examples of materials and properties may include a fabric (such as a weave or knit type, a fiber type (cotton, wool, flax, polyester, polypropylene), a thread size, a thread count, a color, an integral design (kit, knit, tapestry), a bolt width, a selvage type, a surface (hand), and the like.

The properties may also include plastics, which may include sub-properties such as color, surface quality (a bidirectional luminance function), melting point, impact resistance, a forming method (thermoplastic, cast), a type (acrylic, polypropylene, etc.), and the like.

The properties may also include metals, which may include sub-properties such as a type (aluminum, steel, copper, brass, etc.), a color, a surface quality (e.g., a bidirectional luminance function), a melting point, a tensile strength, a shear strength, toxicity, and the like.

The properties may also include non-woven specified by a type (paper, felt, Tyvek, etc.), a color, a surface quality (e.g., a bidirectional luminance function), a surface type (hot pressed, natural, textured, etc.), a weight per square meter, an acid content, a compatible media, coating, and the like.

The properties may also include metamaterials which may be described as a combination of multiple materials created during a manufacturing process. For instance, during a fused deposition manufacture, plastics with a variety of properties may be mixed to provide a physical product with gradations of flexibility, durometer, and the like. According to another example, during the laser sintering of metals, a mix of metal alloys with a variety of properties may be deposited, resulting in a product composed of gradations of metallic properties. According to yet another example, during high-resolution UV printing, layers of the UV-cured material with different refractive indices may be deposited, resulting in a large variety of optical effects.

The properties may also include embellishments such as a trim color, designs, and applied ornaments. The trim colors may indicate the color of the edging around the sleeve of a t-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and may allow for a limited set of properties to be transferred from one product to another. Other properties may be specific to a particular product or manufacturing method.

It may be appreciated that much of the novel art of the system and method is in enumerating the constraints imposed by manufacturing a specific custom product and crafting these constraints as a set of product option key-value pairs. These manufacturing constraints are propagated through the entire system and method, and using these product option key-values allows for the manufacturing of a series of custom products that meet these physical constraints.

Referring again to FIG. 3A, in some embodiments, core services 16 refer to services implemented in a role-based collaboration platform. In the depicted example, core services 16 may be provided by one or more real-view (RLV) servers 16A and a product option framework 16AA. Both RLV servers 16A and product option framework 16AA may use one or more data tier databases 16B, including RLV Data 16C, a product options database 16D, a transaction database 16E, and the like.

In some embodiments, core services 16 may also utilize internal tools 16F, such as computational photographic tools 16E, customer support tools 16G, launch pads tools 16H, and the like.

Product option framework 16AA is also referred to as a persistent design data framework. The framework data may include a product option set, which may include a set of product options about a specific product type. It usually contains the product instructions (e.g., collaboration components 106 in FIG. 2) for manufacturing, or producing the product.

In some embodiments, product option framework 16AA is configured to provide services for transforming ProductOption key-value pairs (i.e., manufacturing constraints) from one product to the other. Transforming the ProductOption key-value pairs from one product to another may require, for example, transforming the color space (i.e., sRGB to CMYK US Web Coated (SWOP) v2), transforming an image from raster to vector, and/or resizing the image for the fit.

Figure 3B:
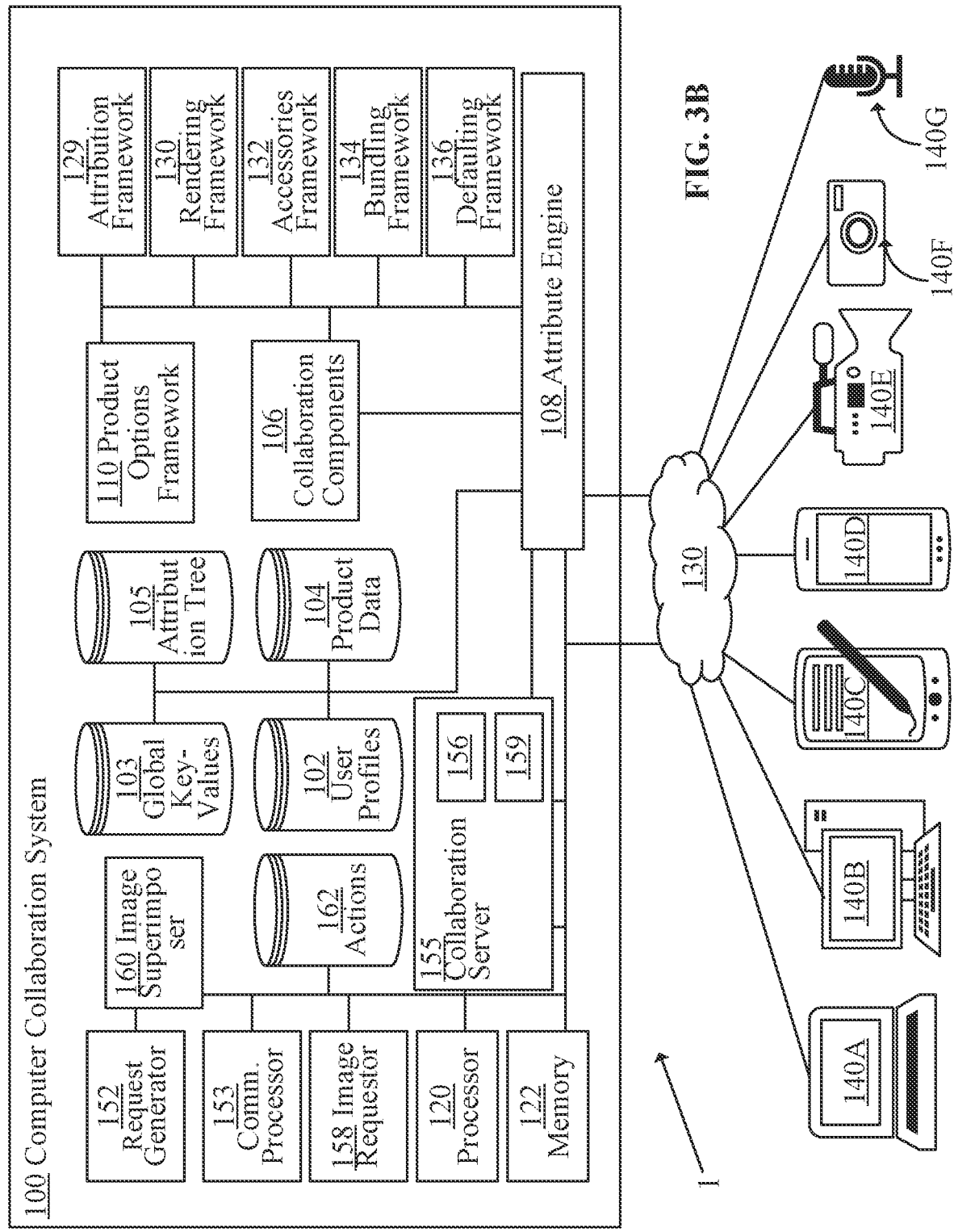
FIG. 3B is a block diagram showing an example of a role-based collaboration platform.

An example use case of the product option framework is described in detail in FIG. 3B.

In some embodiments, there are two basic types of product instructions (1) fixed (that includes the instructions for the product which are fixed and not customized), and (2) custom (that contain the logic to transform a user interface parameter into a product instruction).

In some embodiments, the product option set contains the logic to enumerate each customizable option in a manner that presents a complete user interface to change the parametric product instructions.

The instructions for manufacturing a custom product are usually parametric. The parameters include the size of the custom product (this can be multi-dimensional, and include width, height, depth, and the like). The parameters may also relate to human size or age. The parameters may also be custom and based on biometric information.

The parameters may also include a component body color, a component body texture, a trim body color, a trim body texture, a design area, and the like.

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key-value pairs may include a single element, such as length or a ribbon, a vector, such as the size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiments, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type through a well-known relationship.

In some embodiments, a product option framework event chain includes one or more products, and the chain may represent or memorialize an event. The products may represent or memorialize an event. Examples of events may include weddings, birthdays, anniversaries, graduations, national holidays, reunions, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may fit into a birthday event may include the following products: invitations, RSVPs, party bags, party keepsake photos, and the like.

In some embodiments, in a product option set event chain, a key-value pair encodes the next product in the chain. For example, an invitation may be chained to an RSVP card. A key-value may also encode the role of the chained event. For example, a chained RSVP card key-value may further include a recipient of the invitation as the sender role for the RSVP card.

A key-value pair may also encode the shared properties used to set the chained product's properties. For instance, a design for the invitation may be shared with the RSVP card. A key-value may also encode the timing for the chained product. Typically, the event chain properties are custom (parametric), and they may be changed by a product designer to fit a specific product set.

In an embodiment, a product option framework is configured to generate a product option framework user interface. Accordingly, each product option set is associated with logic and code to build a user interface element for each parametric product option. Furthermore, each product options set contains style hints so that each user interface element may be artfully placed to produce a high-quality user experience.

Typically, user interface elements are designed to match each class of values found in all products covered by a product option framework. New user interface elements may be added as the product categories expand. The user interface elements may include a design view, a color editor, a font editor, a size selector, a texture selector, a text editor, a fabric swatch selector, a product configurable image, and the like.

In some embodiments, a product options framework cooperates with a user product renderer that may be implemented in, for example, a RealView server 16A. The user product renderer may be configured to render views of a custom product as though it is already manufactured. Typically, it uses a product option set of key-values as input. It creates one or more run-time assets using computational photography of the manufactured product.

10.8. Example Manufacturing System

Referring again to FIG. 3A, manufacturing instructions may be communicated from core services 16 to manufacturing 18, which may include one or more manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, and the like. Some of that information may be communicated to a carrier (shipping) service selected to deliver the final products to the recipients.

A final product may be manufactured using markups. A markup for, for example, a body color of a product may be made by specifying a distinct and separate color for the BodyColor key-value. A markup for the trim color of a product may be made by specifying a distinct and separate color for, for example, a TrimColor key-value pair. A markup for a design area of a product may be made by specifying a specific marker type (e.g., a removable linear markup, a digital markup, or a digital field markup) for a design-area image.

Construction of a so-called Product RealView geometry may be performed using computational photographic techniques. For example, a BodyColor area of a surface may be recognized and layered as a custom computer graphics shader for rendering light, color, and texture. Each TrimColor area's surface may be recognized and layered as a custom computer graphics shader for rendering light, color, and texture. Rendering of the Product RealView may be performed by setting its product option key-values and shading each of its constructed layers.

10.9. Example Manufacturing Process

As described above, a manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some embodiments, a product options framework (described in detail in FIG. 3C) builds an interface for a key called OutputStyle. The interface for the OutputStyle key may allow a designer (or any other collaborator) to select values for the media for the presentation of an interactive design. The choices may include a JPEG_Image, a GIF_Image, and an H264_Video.

If a designer chooses the GIF_Image option, then the product options framework may send the instructions to the manufacturing system to traverse each of the key values in the KeyValueJournal, and for each key, and use a User Product Renderer to render the state of the custom physical product with that modification as images in the sRGB 32-bit RGBA format. Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8-bit Indexed color.

Then, the manufacturing system may embed a digital watermark that encodes the input KeyValueJournal's UUID in the 8-bit indexed color image cache.

Next, the manufacturing system may begin encoding the image file. For example, the manufacturing system may write the header bytes; write the Logical Screen Descriptor bytes; write the found color palette as a gif Global Color Table; write the gif 8-bit character application name; and embed metadata as a comment (or a watermark) which encodes the input KeyValueJournal's UUID.

Next, the manufacturing system sets a FrameCount to one and proceeds to process each frame in the image file. The processing includes checking if there is an image in the 8-bit indexed color image cache; and if so, then the manufacturing system continues; otherwise, the manufacturing system proceeds to take the next image.

To continue, the manufacturing system writes the gif Graphic Control Description for the FrameCount and then processes the first 8-bit indexed color image cache into blocks of 255 LZW compressed bytes.

Next, the manufacturing system writes the compressed bytes and removes the first image from the 8-bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, executing the manufacturing instructions to manufacture the product ends, and the manufacturing of the product is completed.

11. Example Product Collaboration Platform

In some embodiments, the approach presented herein is implemented in one or more computer systems that host a product collaboration platform. Alternatively, the approach may be implemented in one or more computer systems that communicate with the collaboration platform but that do not host the platform itself. For the clarity of the description, it is assumed that the computer environment supporting the approach presented herein is implemented in the product collaboration platform.

FIG. 3B is a block diagram showing an example of a role-based collaboration platform. In the example depicted in FIG. 3B, a computer collaboration system 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155 (including a monitoring system 156, and a request analyzer 159), one or more blacklist databases 163, one or more actions databases 162, a request generator 152, a communications processor 153, and an image requestor 158, and an image superimposer 160. Computer collaboration system 100 may communicate directly, or via one or more communications networks 130, with one or more user computers 140A-140G, all described in detail later.

Computer collaboration system 100 shown in FIG. 3B is provided herein to illustrate clear examples and should not be considered limiting in any way. Other computer collaboration systems may include additional components such as computer servers, various input/output devices, and additional software and/or hardware components that are not depicted in FIG. 3C. Other computer collaboration systems may be implemented in cloud-based systems, distributed computer networks, and the like. Other computer collaboration systems may include fewer components than example computer collaboration system 100 shown in FIG. 3B.

Certain components are depicted in FIG. 3B and also described in U.S. Pat. No. 18,120,402. The components such as request generator 152, image requestor 158, and image superimposer 160 were described above.

12. Example Flow Chart for a Synthetic Image Example

Figure 4A:
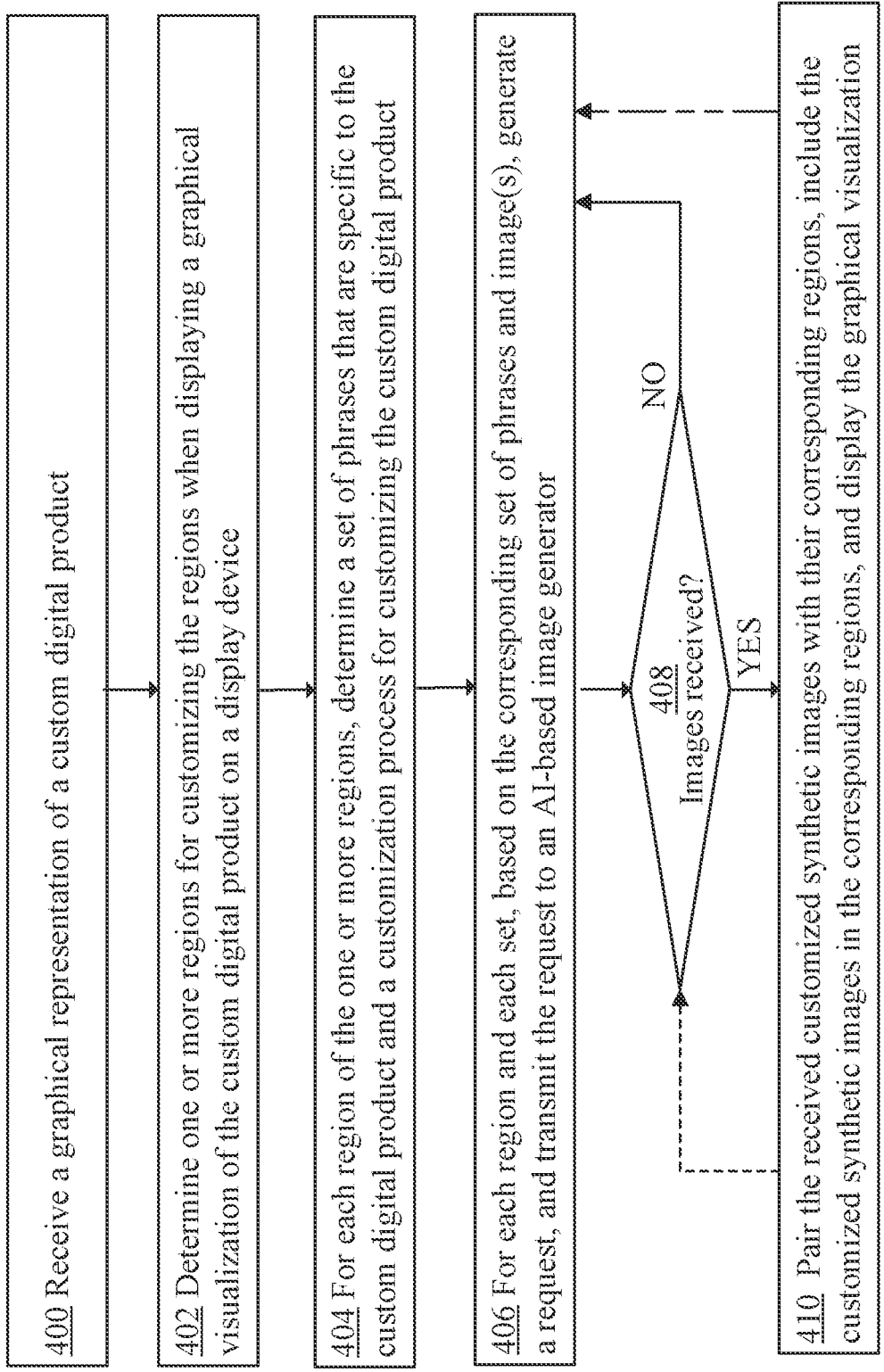
FIG. 4A is a flow chart depicting an example process for generating digital image extensions contextually based on a custom image.

FIG. 4A is a flow chart depicting an example process for generating digital image extensions contextually based on a custom image. The method may be performed by a computer collaboration system 100, or its visualization service 100A. Both, the computer collaboration system and the visualization service are configured to communicate with AI-based image generator 180 and to request and receive synthetic AI-based images. For simplicity of the description, it is assumed that the below steps are performed by the visualization service.

In step 400, a visualization service of a computer collaboration system receives a graphical representation of a custom digital product. A graphical representation of the custom digital product may be constructed using a series of rendering and compositing actions derived from product description data for the custom digital product.

The compositing actions include manufacturing instructions. The product description data comprise a plurality of parameters of the custom digital product. Each parameter, of the plurality of parameters of the custom product, is a key-value pair. A key-value pair is a data structure that includes an attribute key and a corresponding attribute value.

In step 402, the visualization service determines one or more regions for customizing a region when displaying the graphical representation of the custom digital product on a display device.

In step 404, the visualization service determines, for each region of one or more regions, a set of phrases that are specific to the custom digital product and a customization process for customizing the custom digital product.

A set of phrases comprises one or more key-value pairs extracted from the product description data. The set of phrases may also include one or more pieces of information extracted from a user profile of a user who customized the custom digital product. The set of phrases may also include one or more pieces of information extracted from a repository of events associated with the custom digital product.

In step 406, for each region and based on the corresponding set of phrases, the visualization service generates a request. Also in this step, the visualization service transmits the request to an AI-based image generator configured to generate synthetic images.

Transmitting the requests to the AI-based image generator causes the AI image generator to generate, for each region and each request for the region, a customized synthetic image based on, at least in part, the synthetic image generation request and a repository of images. None of the customized synthetic images is a copy of any image from the repository of images. Then, the AI image generator transmits the customized synthetic image to the computer collaboration system.

A customized synthetic image is generated by synthesizing two or more images extracted from the repository of images that are tagged with phrases matching one or more phrases in the set of phrases. Images in the repository of images are tagged using corresponding tags. The customized synthetic image is generated contemporaneously by updating a display of the custom digital product on the display device.

In step 408, the visualization service checks if any of the synthetic images have been received from the AI image generator in response to the sent requests. If the images have been received, then the visualization service proceeds to step 410. Otherwise, the visualization service continues checking in step 406.

In step 410, the visualization service pairs the received customized synthetic images with their corresponding regions and includes the customized synthetic image in the corresponding region.

Also in this step, the visualization service causes displaying, on the display device, a graphical visualization of the custom digital product along with the customized synthetic images included in the corresponding regions.

In addition, if some of the expected customized synthetic images have not been received, the visualization service may either await such images in step 408, regenerate a request (or requests), or end the process.

13. Example Flow Chart for Multiple Synthetic Images

Figure 4B:
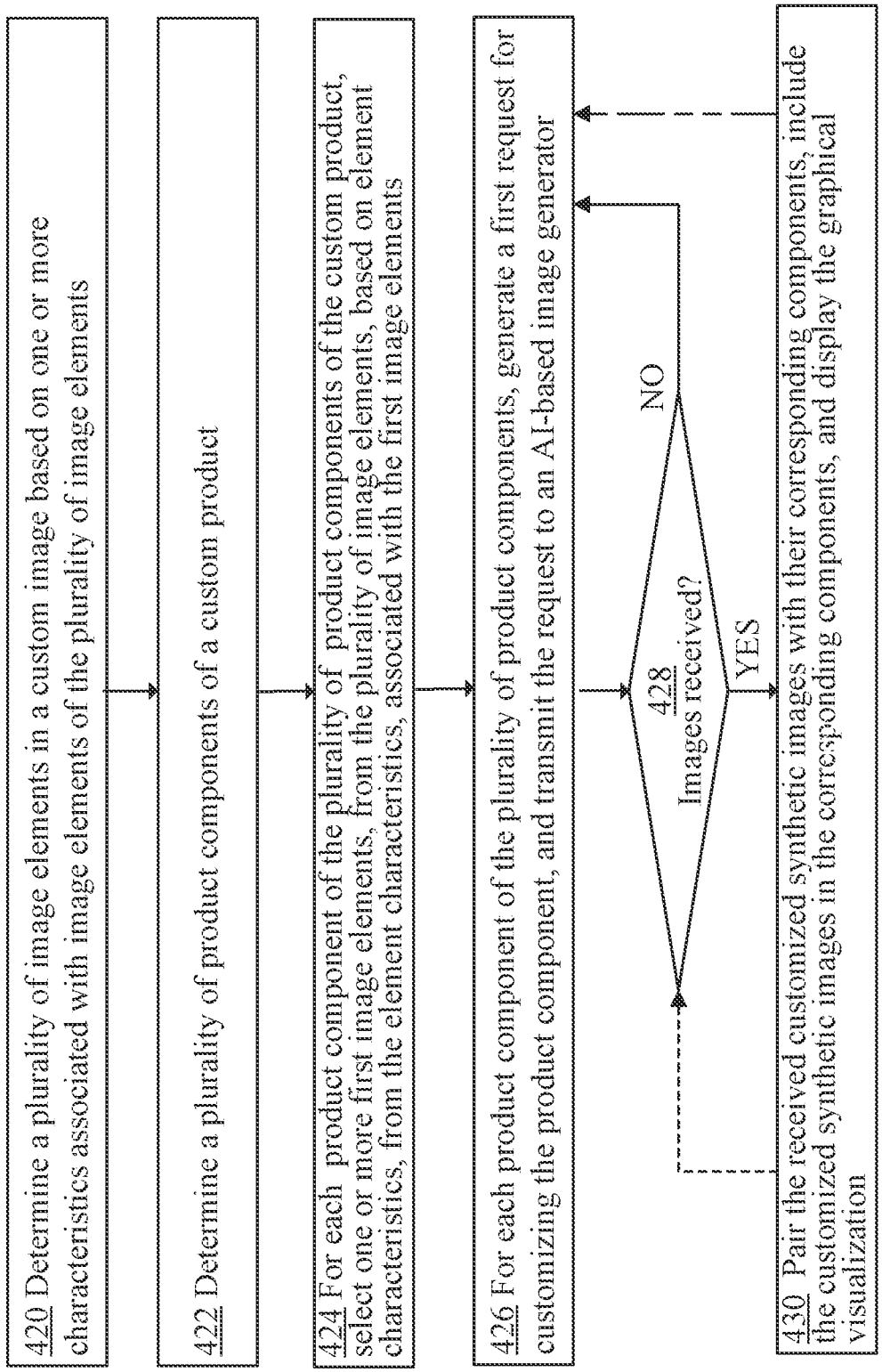
FIG. 4B is a flow chart depicting an example process for generating digital image extensions contextually based on a custom image.

FIG. 4B is a flow chart depicting an example process for generating digital image extensions contextually based on a custom image. The method may be performed by a computer collaboration system 100, or its visualization service 100A. Both, the computer collaboration system and the visualization service are configured to communicate with AI-based image generator 180 and to request and receive synthetic AI-based images. For simplicity of the description, it is assumed that the below steps are performed by the visualization service.

In step 420, a visualization service of a computer collaboration system determines a plurality of image elements in a custom image based on one or more characteristics associated with image elements of the plurality of image elements. The plurality of image elements of the custom image may include, for example, the individual elements of the image. Referring to FIG. 1L, the custom image is a picture of a woman; the image elements of the picture of the woman may be a picture of the woman's face, a picture of the woman's hair, a picture of the woman's blouse, a picture of the background, and the like. The characteristics of an element may include the element's color, the element's color scheme, the element's color palette, and the like.

In step 422, the visualization service determines a plurality of product components of a custom product. The plurality of product components of the custom product may include, for example, various components of a physical product. The example shown in FIG. 1L shows a bag, and the product components of the bag may include, for example, the bag's main compartment, the bag's flap, the bag' piping, the bag's belt, and the like. Continuing with the example shown in FIG. 1L, each component of the bag may have one or more characteristics, such as size, shape, thickness, and the like. Therefore, the bag's main compartment may have its characteristics, the bag's piping may have its characteristics and the like.

In step 424, the visualization service selects, for each product component of the plurality of product components of the custom product, one or more first image elements, from the plurality of image elements, based on element characteristics, from the one or more element characteristics, associated with the one or more first image elements. Referring to FIG. 1L, suppose that a product component of the bag is the bag's main compartment. Furthermore, suppose that the selected component is the bag's main compartment. Moreover, suppose that the image is the depiction of a woman with blond hair. The first image elements may include an image of the woman, an image of the woman's hair, an image of the woman's blouse, an image of the woman's background, and the like.

In step 426, the visualization service generates, for each product component of the plurality of components of the custom product, a first request. The first request is generated based on, at least, the selected product component and the one or more element characteristics associated with the one or more first image elements. Also in this step, the visualization service transmits the first request to an AI-based image generator configured to generate synthetic images.

The first request may include a set of phrases that comprises one or more key-value pairs extracted from the product description data. The set of phrases may also include the element characteristics associated with the first image elements, as well as characteristics of the first image elements. The set of phrases may also include one or more pieces of information extracted from a user profile of a user who customized the custom digital product. The set of phrases may also include one or more pieces of information extracted from a repository of events associated with the custom digital product.

That step also includes transmitting the first request to the AI-based image generator causes the AI image generator to generate, for each component and the first element, a customized synthetic image based on, at least in part, the synthetic image generation request and a repository of images. None of the customized synthetic images is a copy of any image from the repository of images. Then, the AI image generator transmits the customized synthetic image to the computer collaboration system.

A customized synthetic image is generated by synthesizing two or more images extracted from the repository of images that are tagged with phrases matching one or more phrases in the set of phrases. Images in the repository of images are tagged using corresponding tags. The customized synthetic image is generated contemporaneously by updating a display of the custom digital product on the display device.

In step 428, the visualization service checks if any of the synthetic images have been received from the AI image generator in response to the sent requests. If the images have been received, then the visualization service proceeds to step 430. Otherwise, the visualization service continues checking in step 426.

In step 430, the visualization service pairs the received customized synthetic images with their corresponding components and includes the customized synthetic image in the corresponding component/region.

Also in this step, the visualization service causes displaying, on the display device, a graphical visualization of the custom digital product along with the customized synthetic images included in the corresponding regions.

In addition, if some of the expected customized synthetic images have not been received, the visualization service may either await such images in step 428, regenerate a request (or requests), or end the process.

14. Example Flow Chart for Multiple Synthetic Images

Figure 4C:
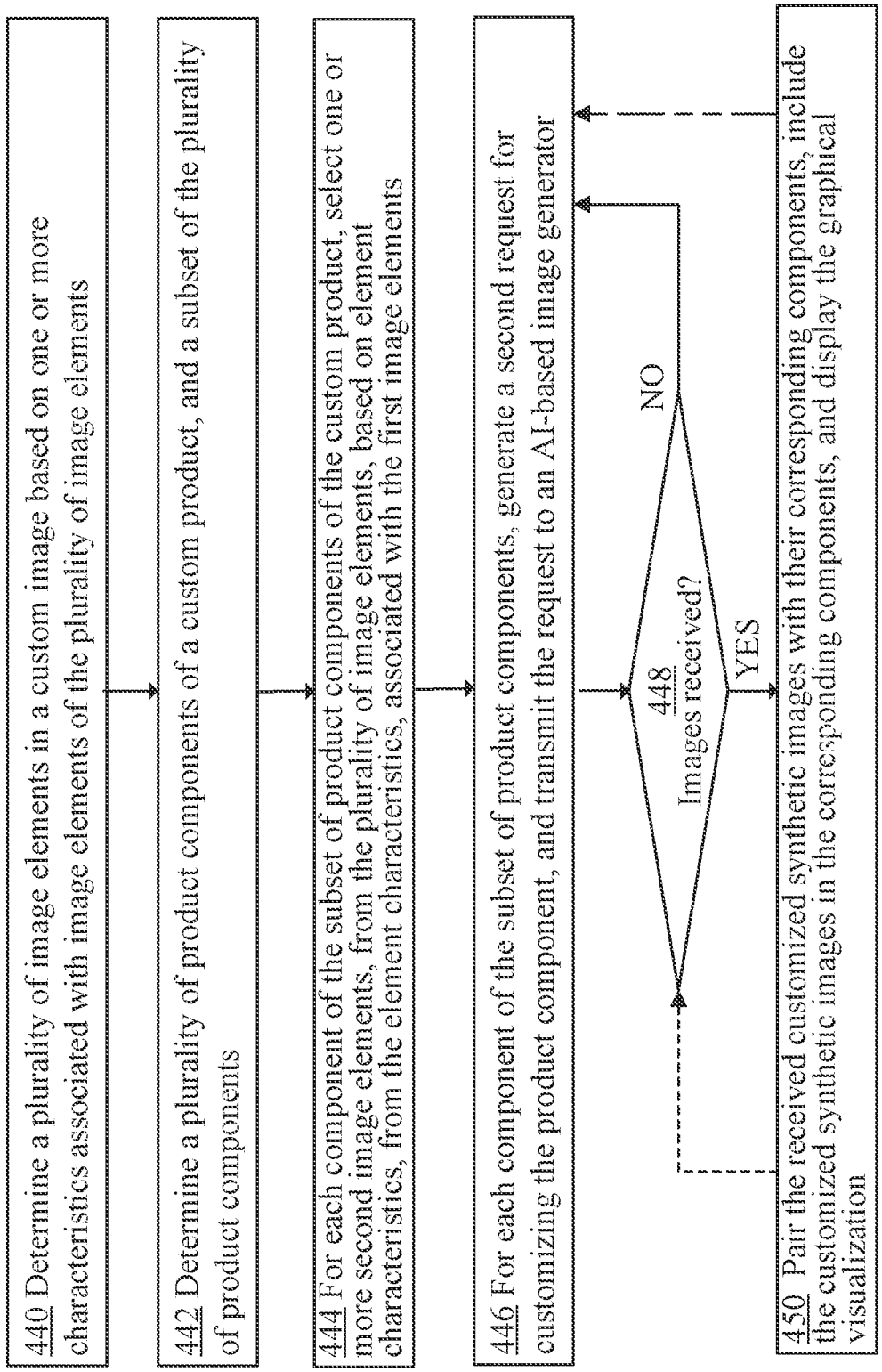
FIG. 4C is a flow chart depicting an example process for generating digital image extensions contextually based on a custom image.

FIG. 4C is a flow chart depicting an example process for generating digital image extensions contextually based on a custom image. The method may be performed by a computer collaboration system 100, or its visualization service 100A. Both, the computer collaboration system and the visualization service are configured to communicate with AI-based image generator 180 and to request and receive synthetic AI-based images. For simplicity of the description, it is assumed that the below steps are performed by the visualization service.

In step 440, a visualization service of a computer collaboration system determines a plurality of image elements in a custom image based on one or more characteristics associated with image elements of the plurality of image elements. The plurality of image elements of the custom image may include, for example, the individual elements of the image. Referring to FIG. 1L, the custom image is a picture of a woman; the image elements of the picture of the woman may be a picture of the woman's face, a picture of the woman's hair, a picture of the woman's blouse, a picture of the background, and the like. The characteristics of an element may include the element's color, the element's color scheme, the element's color palette, and the like.

In step 442, the visualization service determines a plurality of product components of a custom product, and then a subset of the plurality of product components of the custom product. The plurality of product components of the custom product may include, for example, various components of a physical product. The example shown in FIG. 1L shows a bag, and the product components of the bag may include, for example, the bag's main compartment, the bag's flap, the bag' piping, the bag's belt, and the like. Continuing with the example shown in FIG. 1L, each component of the bag may have one or more characteristics, such as size, shape, thickness, and the like. Therefore, the bag's main compartment may have its characteristics, the bag's piping may have its characteristics, and the like. A subset of components may be selected based on many factors, including a user's preference, a collaboration platform's suggestions, and the like.

In step 444, the visualization service selects, for each component of the subset of product components of the custom product, one or more second image elements, from the plurality of image elements, based on element characteristics, from the one or more second element characteristics, associated with the one or more second image elements. Referring to FIG. 1L, suppose that a subset of product components of the bag includes the bag's main compartment and the bag's flap. Furthermore, suppose that the selected component is the bag's main compartment. Moreover, suppose that the image is the depiction of a woman with blond hair. The first image elements may include an image of the woman, an image of the woman's hair, an image of the woman's blouse, an image of the woman's background, and the like.

In step 446, the visualization service generates, for each product component of the subset of components of the custom product, a second request. The second request is generated based on, at least, the selected product component and the one or more element characteristics associated with the one or more first image elements. Also in this step, the visualization service transmits the second request to an AI-based image generator configured to generate synthetic images.

The second request may include a set of phrases that comprises one or more key-value pairs extracted from the product description data. The set of phrases may also include the element characteristics associated with the second image elements, as well as characteristics of the second image elements. The set of phrases may also include one or more pieces of information extracted from a user profile of a user who customized the custom digital product. The set of phrases may also include one or more pieces of information extracted from a repository of events associated with the custom digital product.

This step also includes transmitting the first request to the AI-based image generator causes the AI image generator to generate, for each component and the first element, a customized synthetic image based on, at least in part, the synthetic image generation request and a repository of images. None of the customized synthetic images is a copy of any image from the repository of images. Then, the AI image generator transmits the customized synthetic image to the computer collaboration system.

A customized synthetic image is generated by synthesizing two or more images extracted from the repository of images that are tagged with phrases matching one or more phrases in the set of phrases. Images in the repository of images are tagged using corresponding tags. The customized synthetic image is generated contemporaneously by updating a display of the custom digital product on the display device.

In step 448, the visualization service checks if any of the synthetic images have been received from the AI image generator in response to the sent requests. If the images have been received, then the visualization service proceeds to step 450. Otherwise, the visualization service continues checking in step 446.

In step 450, the visualization service pairs the received customized synthetic images with their corresponding components from the subset and includes the customized synthetic image in the corresponding component/region.

Also in this step, the visualization service causes displaying, on the display device, a graphical visualization of the custom digital product along with the customized synthetic images included in the corresponding regions.

In addition, if some of the expected customized synthetic images have not been received, the visualization service may either await such images in step 448, regenerate a request (or requests), or end the process.

15. Implementation Example

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

Figure 5:
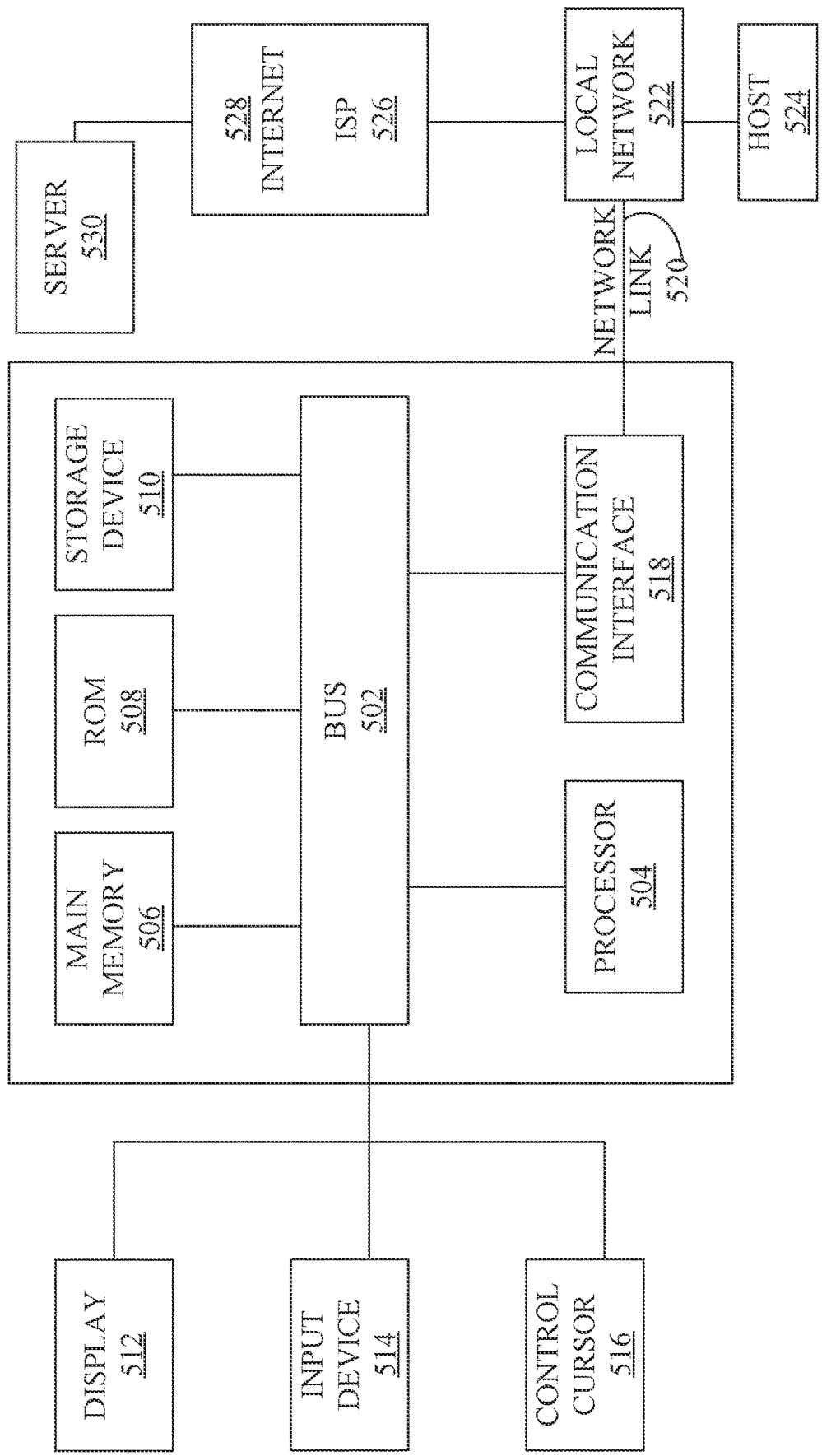
FIG. 5 is a block diagram that illustrates a computer system with which the techniques herein may be implemented.

FIG. 5 is a block diagram that depicts an example computer system 500 upon which embodiments may be implemented. Computer system 500 includes a bus 502 or other communication mechanism for communicating information, and a processor 504 coupled with bus 502 for processing information. Computer system 500 also includes a main memory 506, such as random-access memory (RAM) or another dynamic storage device, coupled to bus 502 for storing information and instructions to be executed by processor 504. Main memory 506 also may be used for storing temporary variables or other intermediate information during the execution of instructions to be executed by processor 504. Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. Although bus 502 is illustrated as a single bus, bus 502 may comprise one or more buses. For example, bus 502 may include without limitation a control bus by which processor 504 controls other devices within computer system 500, an address bus by which processor 504 specifies memory locations of instructions for execution or any other type of bus for transferring data or signals between components of computer system 500.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic, or computer software which, in combination with the computer system, causes or programs computer system 500 to be a special-purpose machine. According to one embodiment, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated service digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams.

Computer system 500 can send messages and receive data, including program code, through the network(s), network link 520, and communication interface 518. In the Internet example, server 530 might transmit a requested code for an application program through Internet 528, ISP 526, local network 522, and communication interface 518. The received code may be executed by processor 504 as it is received, and/or stored in storage device 510, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims issued from this application, in the specific form in which such claims are issued, including any subsequent correction. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A method for generating digital image extensions contextually based on a custom image, the method comprising:

determining a plurality of image elements in a custom image based on one or more characteristics associated with image elements of the plurality of image elements;

determining a plurality of product components of a custom product;

for each product component of the plurality of product components of the custom product:

selecting one or more first image elements, from the plurality of image elements, based on element characteristics, from the one or more characteristics, associated with the one or more first image elements;

based on the product component and the one or more first image elements, generating a first request, comprising image encoding information of the custom image and information about a customization process for customizing the custom product, for customizing the product component of the custom product;

determining a contextual input image that has one or more contextual input image regions that are marked by an opacity mask and that contributes to generating customized synthetic images;

transmitting the first request and information included in the contextual input image to an artificial intelligence (AI) based image generator to cause the AI based image generator to generate, based on, at least in part, the image encoding information of the custom image, the information about the customization process for customizing the custom product, and the information included in the contextual input image, a first customized synthetic image for the product component;

including the first customized synthetic image in a region corresponding to the product component of the custom product;

causing displaying, on a display device, a graphical visualization of the custom product.

2. The method of claim 1, further comprising:

determining a subset of the plurality of product components of a custom product;

for each component of the subset of the plurality of product components of the custom product:

selecting one or more second image elements, from a plurality of images, based on element characteristics, from the one or more characteristics, associated with the one or more second image elements;

based on the subset of the plurality of product components and the one or more second image elements, generating a second request for customizing the subset of the plurality of product components of the custom product;

transmitting the second request to the AI based image generator to cause the AI based image generator to generate, based on, at least in part, the second request, second customized synthetic images for the product component;

including the second customized synthetic images in one or more regions corresponding to the subset of the plurality of product components of the custom product;

causing displaying, on a display device, a graphical visualization of the custom product;

wherein the information included in the contextual input image includes one or more of: hints for how to shade an edge of the custom image, how to include coloring of the edge of the custom image, or how to include lighting for the edge of the custom image as determined by objective requirements.

3. The method of claim 1, further comprising: receiving one or more second customized synthetic images that have been generated by the AI based image generator based on the request;

wherein the one or more second customized synthetic images are included in one or more second regions of the custom product.

4. The method of claim 1, further comprising: receiving one or more third customized synthetic images that have been generated by the AI based image generator based on the request;

wherein the one or more third customized synthetic images are included in one or more third custom products.

5. The method of claim 1, further comprising:

transmitting a graphical representation of the custom product to a manufacturing product rendering unit;

causing the manufacturing product rendering unit to:
render the graphical representation of the custom product;
print, using one or more printing instructions of a manufacturing product rendering unit, the graphical representation of the custom product to generate a physical representation of the custom product.

6. The method of claim 1, wherein the graphical visualization of the customized synthetic images is constructed using a series of rendering and compositing actions;

wherein the graphical visualization of the customized synthetic images is displayed along with a graphical representation of the custom image derived from product description data for the custom image;

wherein the compositing actions include manufacturing instructions;

wherein the product description data comprise a plurality of parameters of the custom product;

wherein each parameter, of the plurality of parameters of the custom product, is a key-value pair;

wherein the key-value pair is a data structure that includes an attribute key and a corresponding attribute value.

7. One or more non-transitory computer-readable storage media storing one or more instructions, which, when executed by one or more processors, cause the one or more processors to perform:

determining a plurality of image elements in a custom image based on one or more characteristics associated with image elements of the plurality of image elements;

determining a plurality of product components of a custom product;

for each product component of the plurality of product components of the custom product:

selecting one or more first image elements, from the plurality of image elements, based on element characteristics, from the one or more characteristics, associated with the one or more first image elements;

based on the product component and the one or more first image elements, generating a first request, comprising image encoding information of the custom image and information about a customization process for customizing the custom product, for customizing the product component of the custom product;

determining a contextual input image that has one or more contextual input image regions that are marked by an opacity mask and that contributes to generating customized synthetic images;

transmitting the first request and information included in the contextual input image to an artificial intelligence (AI) based image generator to cause the AI based image generator to generate, based on, at least in part, the image encoding information of the custom image, the information about the customization process for customizing the custom product, and the information included in the contextual input image, a first customized synthetic image for the product component;

including the first customized synthetic image in a region corresponding to the product component of the custom product;

causing displaying, on a display device, a graphical visualization of the custom product.

8. The one or more non-transitory computer-readable storage media of claim 7, storing additional instructions for:

determining a subset of the plurality of product components of a custom product;

for each component of the subset of the plurality of product components of the custom product:

selecting one or more second image elements, from a plurality of images, based on element characteristics, from the one or more characteristics, associated with the one or more second image elements;

based on the subset of the plurality of product components and the one or more second image elements, generating a second request for customizing the subset of the plurality of product components of the custom product;

transmitting the second request to the AI based image generator to cause the AI based image generator to generate, based on, at least in part, the second request, second customized synthetic images for the product component;

including the second customized synthetic images in one or more regions corresponding to the subset of the plurality of product components of the custom product;

causing displaying, on a display device, a graphical visualization of the custom product;

wherein the information included in the contextual input image includes one or more of: hints for how to shade an edge of the custom image, how to include coloring of the edge of the custom image, or how to include lighting for the edge of the custom image as determined by objective requirements.

9. The one or more non-transitory computer-readable storage media of claim 7, storing additional instructions for:
receiving one or more second customized synthetic images that have been generated by the AI based image generator based on the request;
 wherein the one or more second customized synthetic images are included in one or more second regions of the custom product.

10. The one or more non-transitory computer-readable storage media of claim 7, storing additional instructions for:
receiving one or more third customized synthetic images that have been generated by the AI based image generator based on the request;
 wherein the one or more third customized synthetic images are included in one or more third custom products.

11. The one or more non-transitory computer-readable storage media of claim 7, storing additional instructions for:
 transmitting a graphical representation of the custom product to a manufacturing product rendering unit;
 causing the manufacturing product rendering unit to:
  render the graphical representation of the custom product;
  print, using one or more printing instructions of a manufacturing product rendering unit, the graphical representation of the custom product to generate a physical representation of the custom product.

12. The one or more non-transitory computer-readable storage media of claim 7,
 wherein the graphical visualization of the customized synthetic images is constructed using a series of rendering and compositing actions;
 wherein the graphical visualization of the customized synthetic images is displayed along with a graphical representation of the custom image derived from product description data for the custom image;
 wherein the compositing actions include manufacturing instructions;
 wherein the product description data comprise a plurality of parameters of the custom product;
 wherein each parameter, of the plurality of parameters of the custom product, is a key-value pair;
 wherein the key-value pair is a data structure that includes an attribute key and a corresponding attribute value.

13. A custom product computer system generator comprising:
 a memory unit;
 one or more processors; and
 a custom product computer storing one or more instructions, which, when executed by one or more processors, cause the one or more processors to perform:
  determining a plurality of image elements in a custom image based on one or more characteristics associated with image elements of the plurality of image elements;
  determining a plurality of product components of a custom product;
  for each product component of the plurality of product components of the custom product:
   selecting one or more first image elements, from the plurality of image elements, based on element characteristics, from the one or more characteristics, associated with the one or more first image elements;
   based on the product component and the one or more first image elements, generating a first request, comprising image encoding information of the custom image and information about a customization process for customizing the custom product, for customizing the product component of the custom product;
   determining a contextual input image that has one or more contextual input image regions that are marked by an opacity mask and that contributes to generating customized synthetic images;
   transmitting the first request and information included in the contextual input image to an artificial intelligence (AI) based image generator to cause the AI based image generator to generate, based on, at least in part, the image encoding information of the custom image, the information about the customization process for customizing the custom product, and the information included in the contextual input image, a first customized synthetic image for the product component;
   including the first customized synthetic image in a region corresponding to the product component of the custom product;
  causing displaying, on a display device, a graphical visualization of the custom product.

14. The custom product computer system generator of claim 13, storing additional instructions for:
 determining a subset of the plurality of product components of a custom product;
 for each component of the subset of the plurality of product components of the custom product:
  selecting one or more second image elements, from a plurality of images, based on element characteristics, from the one or more characteristics, associated with the one or more second image elements;
  based on the subset of the plurality of product components and the one or more second image elements, generating a second request for customizing the subset of the plurality of product components of the custom product;
  transmitting the second request to the AI based image generator to cause the AI based image generator to generate, based on, at least in part, the second request, second customized synthetic images for the product component;
  including the second customized synthetic images in one or more regions corresponding to the subset of the plurality of product components of the custom product;
 causing displaying, on a display device, a graphical visualization of the custom product;
 wherein the information included in the contextual input image includes one or more of: hints for how to shade an edge of the custom image, how to include coloring of the edge of the custom image, or how to include lighting for the edge of the custom image as determined by objective requirements.

15. The custom product computer system generator of claim 13, storing additional instructions for: receiving one or more second customized synthetic images that have been generated by the AI based image generator based on the request;
 wherein the one or more second customized synthetic images are included in one or more second regions of the custom product.

16. The custom product computer system generator of claim 13, storing additional instructions for: receiving one or more third customized synthetic images that have been generated by the AI based image generator based on the request;
 wherein the one or more third customized synthetic images are included in one or more third custom products.

17. The custom product computer system generator of claim 13, storing additional instructions for:
 transmitting a graphical representation of the custom product to a manufacturing product rendering unit;
 causing the manufacturing product rendering unit to:
  render the graphical representation of the custom product;
  print, using one or more printing instructions of a manufacturing product rendering unit, the graphical representation of the custom product to generate a physical representation of the custom product.

18. The custom product computer system generator of claim 13, wherein the graphical visualization of the customized synthetic images is constructed using a series of rendering and compositing actions;
 wherein the graphical visualization of the customized synthetic images is displayed along with a graphical representation of the custom image derived from product description data for the custom image;
 wherein the compositing actions include manufacturing instructions;
 wherein the product description data comprise a plurality of parameters of the custom product;
 wherein each parameter, of the plurality of parameters of the custom product, is a key-value pair;
 wherein the key-value pair is a data structure that includes an attribute key and a corresponding attribute value.

* * * * *